United States Patent
Hayakawa et al.

(10) Patent No.: US 9,740,943 B2
(45) Date of Patent: Aug. 22, 2017

(54) THREE-DIMENSIONAL OBJECT DETECTION DEVICE

(75) Inventors: Yasuhisa Hayakawa, Sagamihara (JP); Osamu Fukata, Yokohama (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 618 days.

(21) Appl. No.: 14/363,882

(22) PCT Filed: Jul. 27, 2012

(86) PCT No.: PCT/JP2012/069095
§ 371 (c)(1),
(2), (4) Date: Jun. 9, 2014

(87) PCT Pub. No.: WO2013/094242
PCT Pub. Date: Jun. 27, 2013

(65) Prior Publication Data
US 2014/0368656 A1    Dec. 18, 2014

(30) Foreign Application Priority Data
Dec. 19, 2011    (JP) .................. 2011-276683

(51) Int. Cl.
*G06K 9/00* (2006.01)
*G06T 7/00* (2017.01)
(Continued)

(52) U.S. Cl.
CPC .......... *G06K 9/00805* (2013.01); *B60R 1/002* (2013.01); *G06K 9/00791* (2013.01);
(Continued)

(58) Field of Classification Search
CPC .............. G06T 3/0062; G06K 9/00805; G06K 9/00791
See application file for complete search history.

(56) References Cited

U.S. PATENT DOCUMENTS

2008/0205706 A1    8/2008    Hongo
2009/0268027 A1    10/2009   Yang
(Continued)

FOREIGN PATENT DOCUMENTS

| JP | 2008219063 A | 9/2008 |
| JP | 2009265783 A | 11/2009 |
| JP | 2010226449 A | 10/2010 |

OTHER PUBLICATIONS

C.T. Lin, T.K. Shen, & Y.W. Shou, "Construction of Fisheye Lens Inverse Perspective Mapping Model and Its Applications of Obstacle Detection", 2010 EURASIP J. on Advances in Signal Processing 1 (Jul. 6, 2010).*

*Primary Examiner* — David N Werner
(74) *Attorney, Agent, or Firm* — Young Basile Hanlon & MacFarlane, P.C.

(57) ABSTRACT

A three-dimensional object detection device can enhance the accuracy in detecting a three-dimensional object regardless of the brightness in the detection environment. The device has an image capture means that captures an image of a predetermined area and an image conversion means that converts the image through a viewpoint conversion into birds-eye view image. A first three-dimensional object detection means aligns positions of bird's-eye view images at different times obtained by the image conversion means, counts the number of pixels that exhibit a predetermined difference on a differential image of the aligned bird's-eye view images to generate a frequency distribution thereby creating differential waveform information, and detects a three-dimensional object on the basis of the differential waveform information. A second three-dimensional object detection means detects edge information from the bird's-eye view image obtained by the image conversion means and detects a three-dimensional object on the basis of the edge information.

9 Claims, 18 Drawing Sheets

(51) Int. Cl.
*G08G 1/16* (2006.01)
*B60R 1/00* (2006.01)
*G06T 7/13* (2017.01)
*H04N 7/18* (2006.01)

(52) U.S. Cl.
CPC ............ *G06K 9/00798* (2013.01); *G06T 7/13* (2017.01); *G08G 1/166* (2013.01); *G08G 1/167* (2013.01); *B60R 2300/607* (2013.01); *B60R 2300/802* (2013.01); *B60R 2300/804* (2013.01); *G06T 2207/10004* (2013.01); *G06T 2207/20048* (2013.01); *G06T 2207/30252* (2013.01); *G06T 2207/30256* (2013.01); *G06T 2207/30261* (2013.01); *H04N 7/18* (2013.01)

(56) References Cited

U.S. PATENT DOCUMENTS

| | | | |
|---|---|---|---|
| 2010/0245578 A1 | 9/2010 | Kakinami | |
| 2011/0074957 A1* | 3/2011 | Kiyohara | G06K 9/342 348/148 |
| 2011/0310245 A1* | 12/2011 | Tsuchiya | G01S 11/12 348/135 |
| 2013/0131922 A1* | 5/2013 | Ogata | B60Q 1/143 701/36 |

* cited by examiner

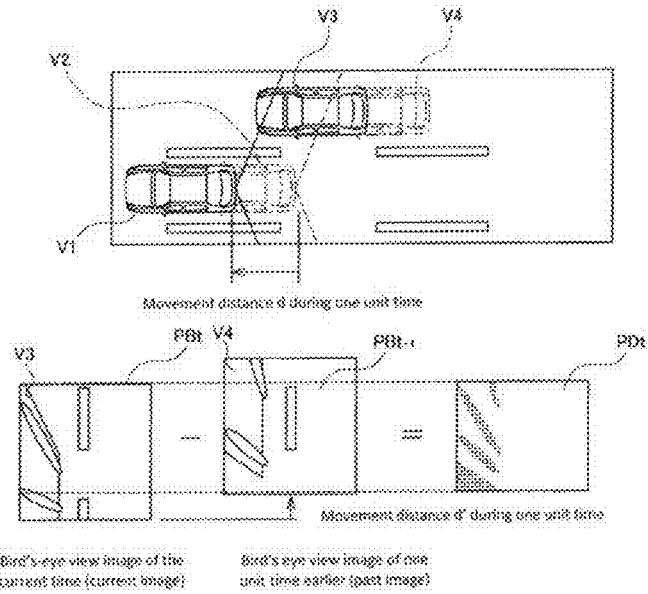
FIG. 4A
FIG. 4B
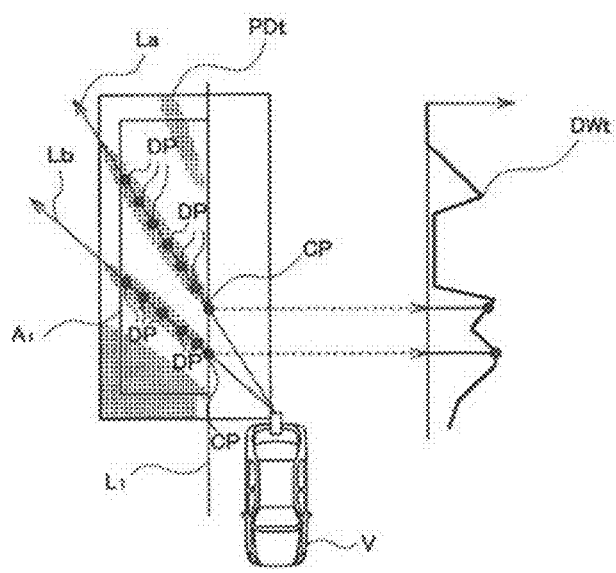
FIG. 5

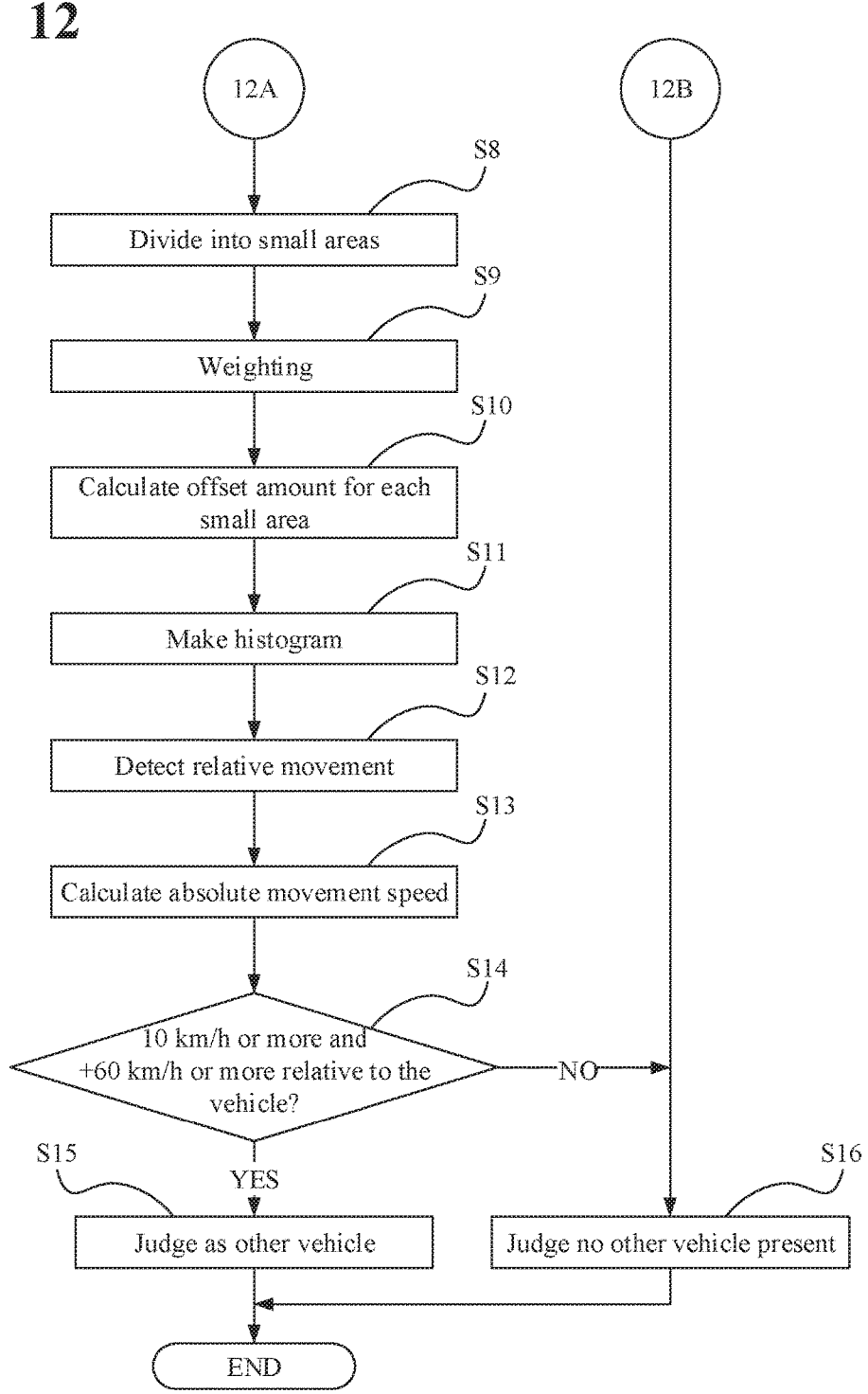

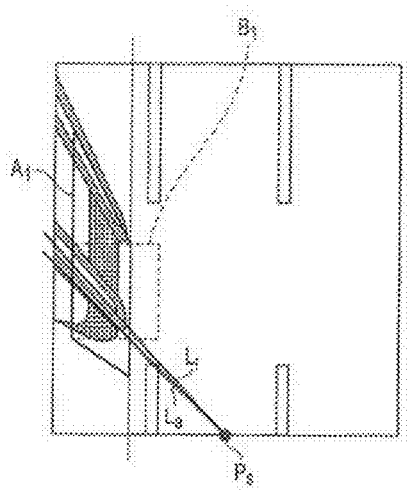
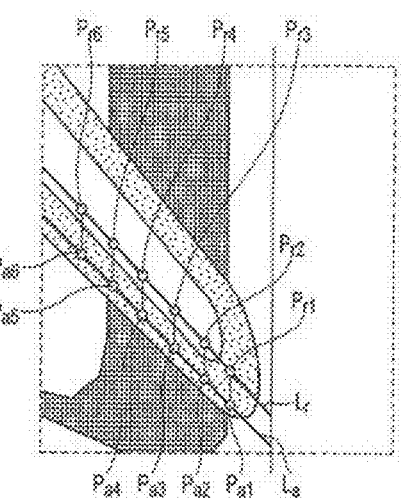
FIG. 15A  FIG. 15B
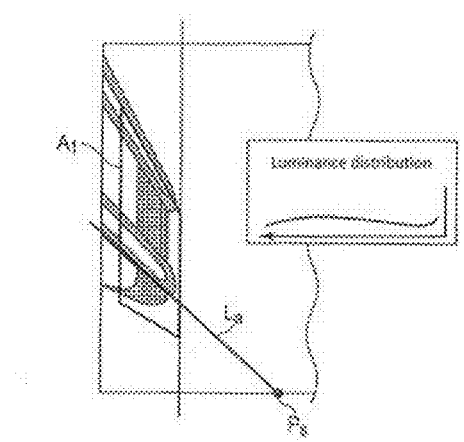
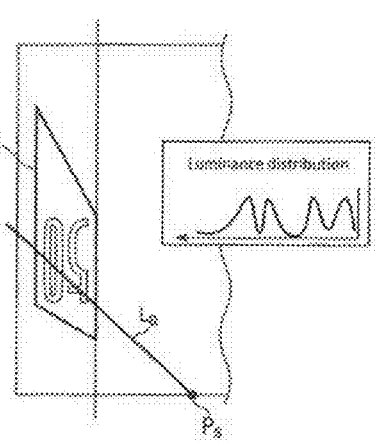
FIG. 16A  FIG. 16B FIG. 27A
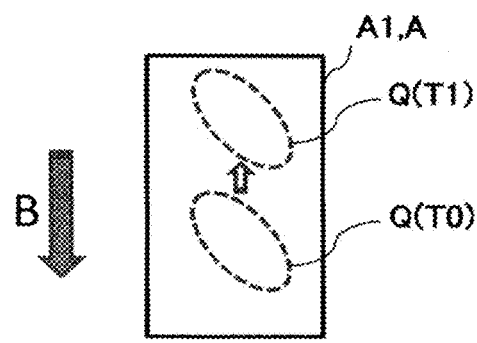
FIG. 27B
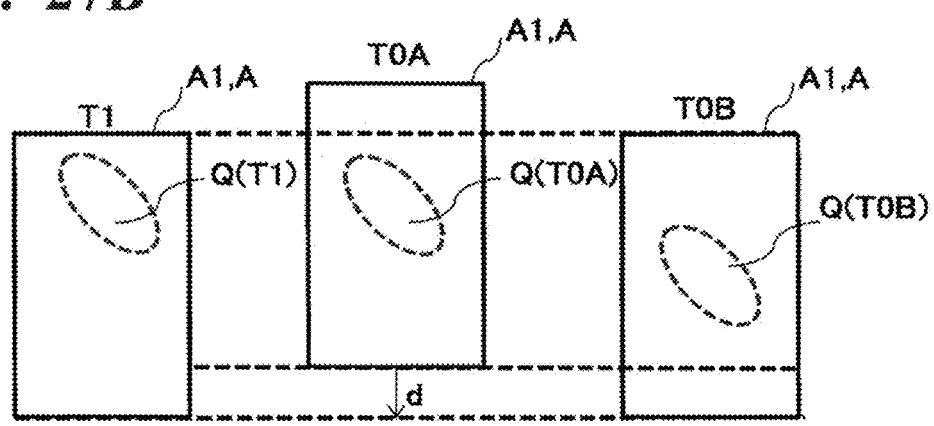
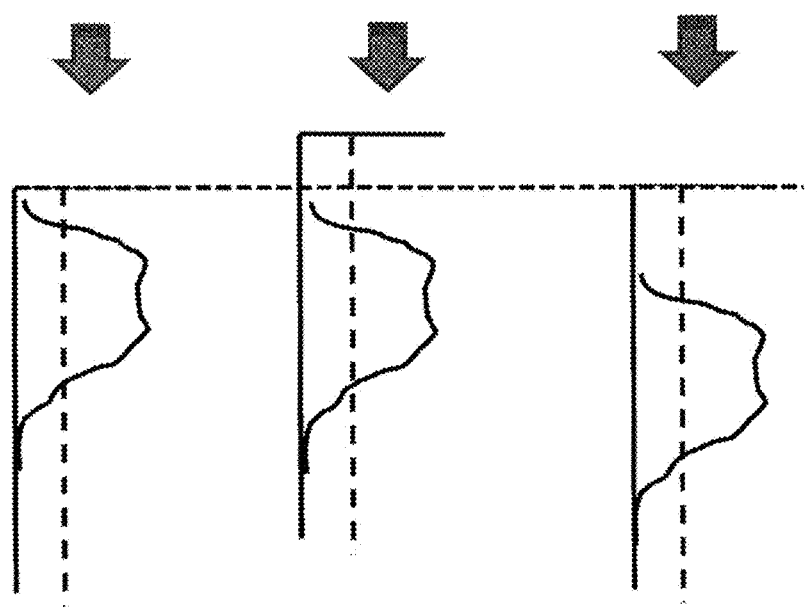

THREE-DIMENSIONAL OBJECT DETECTION DEVICE

CROSS REFERENCE TO RELATED APPLICATION

The present application claims priority to Japanese Patent Application No. 2011-276683, filed Dec. 19, 2011, incorporated herein in its entirety.

TECHNICAL FIELD

The present invention relates to a three-dimensional object detection device.

BACKGROUND

Conventionally, a vehicle periphery monitoring device has been proposed, which detects a three-dimensional object in the periphery of a vehicle and which also detects whether or not the three-dimensional object remains stationary or is moving. This vehicle periphery monitoring device converts two images captured at different times into bird's-eye views, performs a position adjustment of the two bird's-eye views, obtains differences between the two images after the position adjustment, and detects unmatched portions as a three-dimensional object. See, for example, Patent Application Publication No. 2008 219063 A.

SUMMARY

However, such a three-dimensional object detection method as the above prior art based on differences regarding two bird's-eye views has a high possibility of false detection because differences in images occur for various objects if the lighting condition for the road surface significantly changes due to street-lamps and headlights such as in the night.

The objective to be solved by the present invention includes providing a three-dimensional object detection device which can enhance the accuracy in detecting a three-dimensional object regardless of the brightness in the detection environment.

The present invention solves the above one or more problems by increasing a weighting for the detection result based on edge information if the detection environment is dark while increasing a weighting for the detection result based on differential waveform information if the detection environment is bright.

When the detection environment is dark, the weighting for the detection result based on edge information is increased to thereby allow for enhancing the accuracy in detecting a three-dimensional object because the edge information is little affected even if bright-and-dark variation occurs on the road surface, which would cause false detection when utilizing differential waveform information. Moreover, when the detection environment is bright, the weighting for the detection result based on differential waveform information is increased to thereby allow for enhancing the accuracy in detecting a three-dimensional object because the differential waveform information is little affected even if markings on the road surface or other objects are present, which would cause false detection when utilizing the edge information.

BRIEF DESCRIPTION OF DRAWINGS

FIGS. 4A and 4B depict views for explaining an overview of the process in an alignment unit shown in FIG. 3, wherein FIG. 4A is a plan view illustrating a movement state of the vehicle and FIG. 4B is a view illustrating overview of the alignment.

FIG. 5 is a schematic diagram illustrating an aspect of creating differential waveform by a first three-dimensional object detection unit shown in FIG. 3.

FIG. 12 is a flowchart (part 2) illustrating the three-dimensional object detection method which is performed by the viewpoint conversion unit, the alignment unit, the smear detection unit and the first three-dimensional object detection unit shown in FIG. 3 and which uses differential waveform information.

FIGS. 13A and 13B are diagrams illustrating a driving state of the vehicle shown in FIG. 1 (three-dimensional object detection based on edge information), wherein FIG. 13A is a plan view illustrating the positional relationship of detection areas etc. and FIG. 13B is a perspective view illustrating the positional relationship of detection areas etc. in real space.

FIGS. 14A and 14B are diagrams for explaining the operation of a luminance difference calculation unit shown in FIG. 3, wherein FIG. 14A is a diagram illustrating the positional relationship of an attention line, a reference line, an attention point and a reference point in the bird's-eye view image, and FIG. 14B is a diagram illustrating the positional relationship of the attention line, the reference line, the attention point and the reference point in real space.

FIGS. 15A and 15B are diagrams illustrating the detailed operation of the luminance difference calculation unit, wherein FIG. 15A is a diagram illustrating a detection area in the bird's-eye view image and FIG. 15B is a diagram illustrating the positional relationship of an attention line, a reference line, attention points and reference points in the bird's-eye view image.

FIGS. 16A and 16B are diagrams illustrating edge lines and luminance distributions on edge lines, wherein FIG. 16A is a diagram illustrating the luminance distribution when a three-dimensional object (vehicle) is present in the detection area, and FIG. 16B is a diagram illustrating the luminance distribution when no three-dimensional object is present in the detection area.

FIG. 27 illustrates whether a three-dimensional object is a moving object or a stationary object, a focus or attention point.

DETAILED DESCRIPTION OF THE EMBODIMENTS

Figure 1:
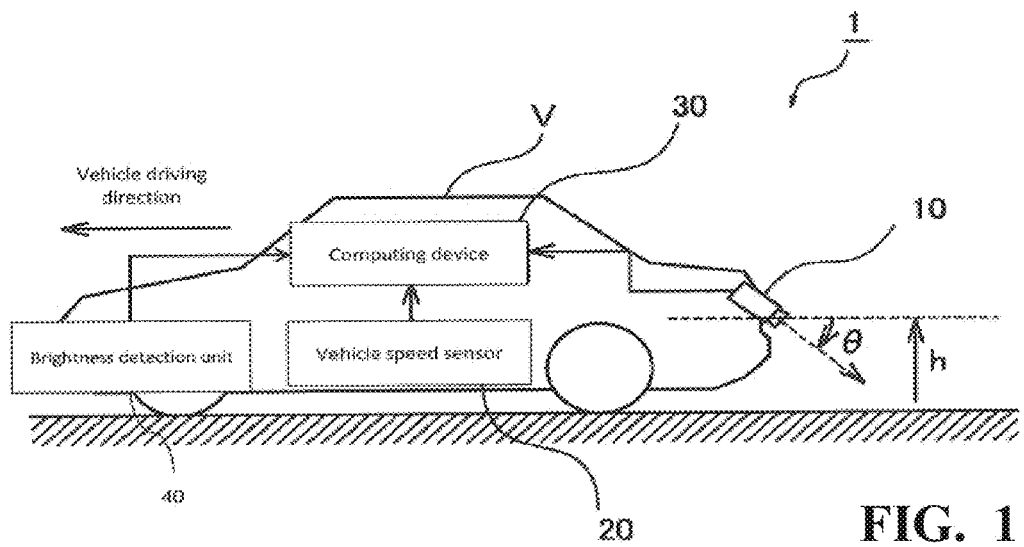
FIG. 1 is a schematic diagram of a vehicle according to one embodiment applied thereto with a three-dimensional object detection device of the present invention.

FIG. 1 is a schematic diagram of a vehicle applied thereto with a three-dimensional object detection device 1 according to one embodiment of the present invention. The three-dimensional object detection device 1 in this example is for the purpose of detecting, when a vehicle V is changing lanes, another vehicle having possibility of contact with the vehicle V to calculate a movement distance. In this regard, the description below is directed to an example where the three-dimensional object detection device 1 is equipped in the vehicle V and there is another vehicle behind as a three-dimensional object to be detected. As shown in the figure, the three-dimensional object detection device 1 in this example comprises a camera 10, a vehicle speed sensor 20, a computing device 30 and a brightness detection unit 40.

As shown in FIG. 1, the camera 10 is mounted to the vehicle V such that the optical axis is directed downward with angle θ from the horizontal direction at the location of height h behind the vehicle V. The camera 10 captures an image of a predetermined area within the surrounding environment of the vehicle V from that position. The vehicle speed sensor 20, which detects the driving speed of the vehicle V, calculates the vehicle speed from a wheel speed detected by a wheel speed sensor for detecting the number of rotations of one or more wheels, for example. The computing device 30 detects a three-dimensional object behind the vehicle and in this example calculates the movement distance and movement speed regarding that three-dimensional object. The brightness detection unit 40 detects the brightness in the predetermined area of which an image is captured by the camera 10, and the details thereof will be described later.

Figure 2:
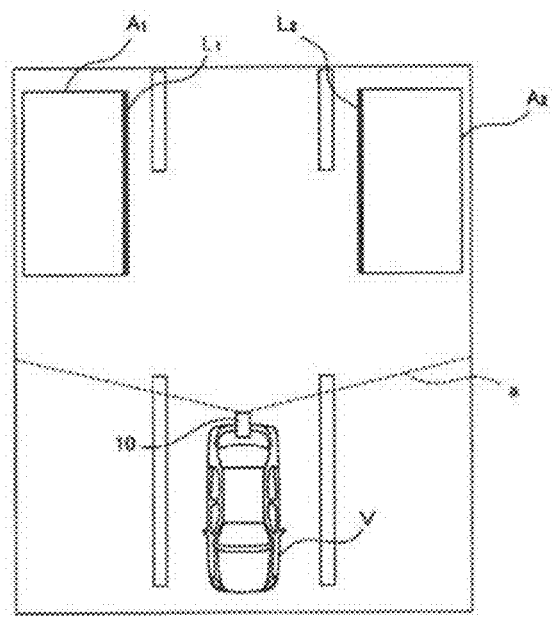
FIG. 2 is a plan view illustrating a driving state of the vehicle shown in FIG. 1 (three-dimensional object detection based on differential waveform information).

FIG. 2 is a plan view illustrating a driving state of the vehicle V shown in FIG. 1. As shown in the figure, the camera 10 captures an image behind the vehicle with a certain field angle "a". For this capturing, the field angle "a" of the camera 10 is set as being a field angle which allows an image capturing not only for the lane where the vehicle V is driving but also for right and left lanes thereof.

Figure 3:
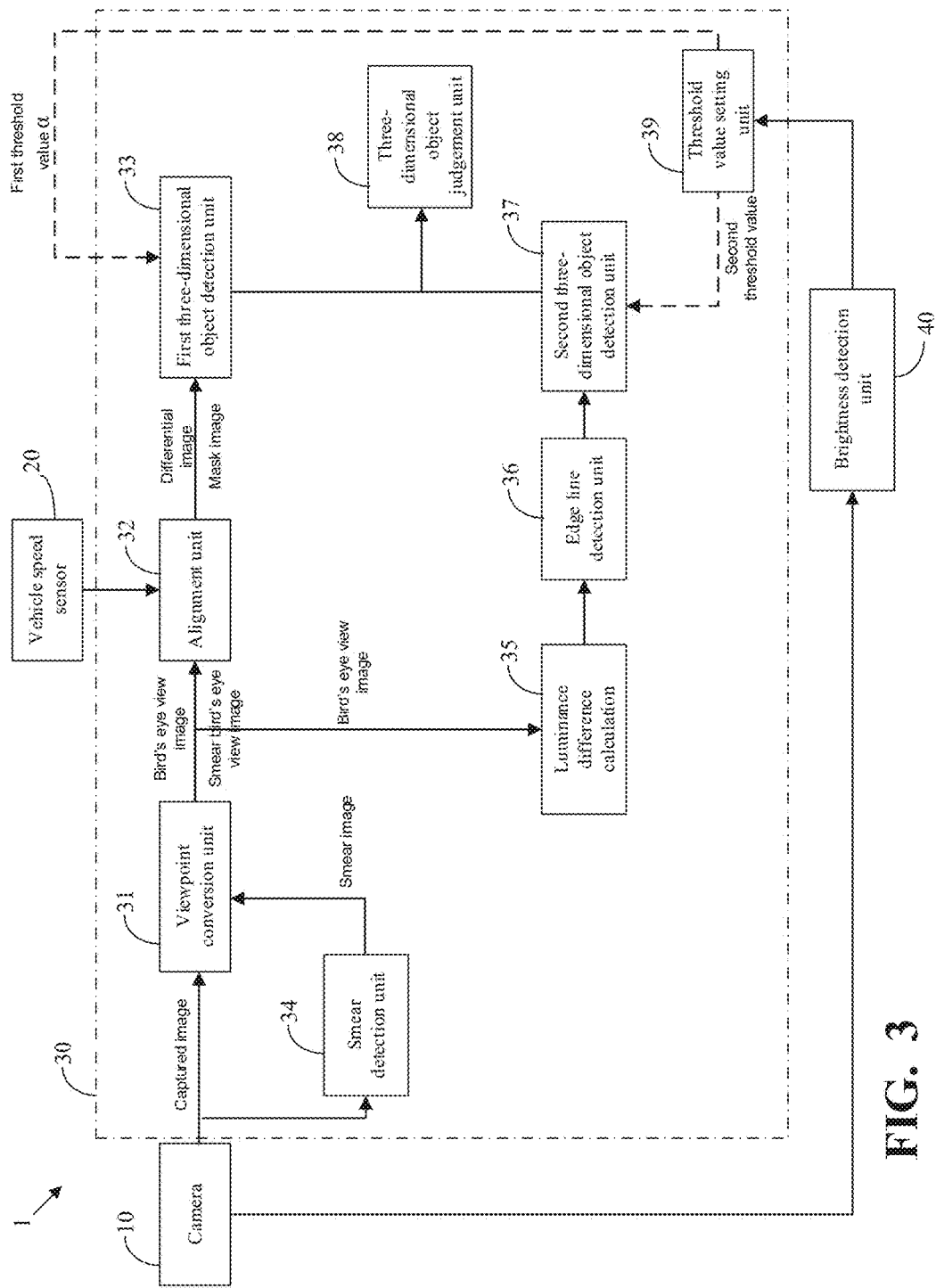
FIG. 3 is a block diagram illustrating details of a computing device shown in FIG. 1.

FIG. 3 is a block diagram illustrating details of the computing device 30 shown in FIG. 1. Note that FIG. 3 also illustrates the camera 10, the vehicle speed sensor 20 and the brightness detection unit 40 in order to make clear the connection relationship therewith.

As shown in FIG. 3, the computing device 30 comprises a viewpoint conversion unit 31, an alignment unit 32, a first three-dimensional object detection unit 33, a smear detection unit 34, a luminance difference calculation unit 35, an edge line detection unit 36, a second three-dimensional object detection unit 37, a three-dimensional object judgment unit 38 and a threshold value setting unit 39. Among them, the viewpoint conversion unit 31, the smear detection unit 34, the alignment unit 32 and the first three-dimensional object detection unit 33 represent a constitutive part which relates to three-dimensional object detection blocks utilizing differential waveform information as will be described later, while the viewpoint conversion unit 31, the luminance difference calculation unit 35, the edge line detection unit 36 and the second three-dimensional object detection unit 37 represent a constitutive part which relates to three-dimensional object detection blocks utilizing edge information as will also be described later. Respective constitutive parts will first be described below.

<<Detection of Three-Dimensional Object Based on Differential Waveform Information>>

The viewpoint conversion unit 31 is input thereto with captured image data of the predetermined area, which was obtained by the camera 10 capturing an image, and subjects the input captured image data to a viewpoint conversion to output bird's-eye view image data in a state of bird's-eye view. The state of bird's-eye view as used herein is a state of being viewed from the above, such as from the viewpoint of a virtual camera looking down vertically. This viewpoint conversion may be performed in such a manner as described in Japanese Published Patent Application No. 2008-219063. The reason that the captured image data is converted with respect to viewpoint into the bird's-eye view image data is based on the principle that vertical edges specific to a three-dimensional object are converted into a group of straight lines passing through a certain fixed point by the viewpoint conversion into the bird's-eye view image data, and utilizing this principle allows to distinguish between a two-dimensional object and a three-dimensional object. Note that results from the image conversion process by the viewpoint conversion unit 31 are also utilized in the detection of a three-dimensional object based on edge information as will be described later.

The alignment unit 32 is sequentially input thereto with the bird's-eye view image data obtained through the viewpoint conversion by the viewpoint conversion unit 31, and aligns positions of the input bird's-eye view image data at different times. FIGS. 4A and 4B are views for explaining the overview of a process in the alignment unit 32, wherein FIG. 4(a) is a plan view illustrating a movement state of the vehicle V and FIG. 4(b) is a view illustrating an overview of the alignment.

As shown in FIG. 4(a), it is assumed that the vehicle V of the current time is positioned at V1 and the vehicle V of one unit time earlier was positioned at V2. It is also assumed that another vehicle V is positioned behind the vehicle V in side-by-side driving state, the other vehicle V of the current time is positioned at V3, and the other vehicle V of one unit time earlier was positioned at V4. It is further assumed that the vehicle V moved a distance d during one unit time. Note that one unit time earlier as used herein may be a past time before the current time by a predetermined time (e.g. one control period), or a past time before the current time by an arbitrary time.

In such conditions, bird's-eye view image $PB_t$ at the current time appears as shown in FIG. 4(b). In this bird's-eye view image $PB_t$, white lines painted on the road surface appear as being rectangular thus in relatively correct plan view, whereas there occurs "falling-down" (radial displacement) regarding the other vehicle V. Similarly, with respect to bird's-eye view image $PB_{t-1}$ of one unit time earlier, white lines painted on the road surface appear as being rectangular thus in relatively correct plan view, whereas there also occurs "falling down" regarding the other vehicle V. This is because, as previously mentioned, vertical edges of a three-dimensional object (including edges rising from the road surface into the three-dimensional space other than vertical edges in a strict sense) appear as a group of straight lines along falling-down directions due to the viewpoint conversion process into bird's-eye view image data, whereas no falling-down occurs for plane images on the road surface because they include no vertical edge.

The alignment unit 32 performs alignment of the bird's-eye view images $PB_t$ and $PB_{t-1}$ as described above by data processing. During this process, the alignment unit 32 offsets the bird's-eye view image $PB_{t-1}$ of one unit time earlier to align it with the bird's-eye view image $PB_t$ of the current time. The left-hand image and the central image in FIG. 4(b) represent a state of being offset by movement distance d'. This movement distance d' is a distance on the bird's-eye view image data, which corresponds to the actual movement distance d of the vehicle V and is determined on the basis of signals from the vehicle speed sensor 20 and the time from one unit time earlier to the current time.

In addition, after the alignment, the alignment unit 32 takes a difference between the bird's-eye view images $PB_t$ and $PB_{t-1}$ to generate data of a differential image $PD_t$. Here, pixel values of the differential image $PD_t$ may be absolute values of the differences between pixel values of the bird's-eye view images $PB_t$ and $PB_{t-1}$, or, if desired to deal with changes in illuminance environment, may be "1"s when the absolute values exceed a predetermined threshold value or otherwise "0"s. The right-hand image in FIG. 4(b) represents the differential image $PD_t$.

Referring again to FIG. 3, the first three-dimensional object detection unit 33 detects a three-dimensional object on the basis of data of the differential image $PD_t$ shown in FIG. 4(b). During this detection, the first three-dimensional object detection unit 33 in this example also calculates the movement distance of the three-dimensional object in real space. In order to detect the three-dimensional object and calculate the movement distance, the first three-dimensional object detection unit 33 creates first a differential waveform.

In creating a differential waveform, the first three-dimensional object detection unit 33 sets a detection area within the differential image $PD_t$. The three-dimensional object detection device 1 in this example is for the purpose of calculating, when the vehicle V is changing lanes, the movement distance regarding another vehicle having possibility of contact with the vehicle V. To this end, in this example, rectangular detection areas A1 and A2 are set behind the vehicle V, as shown in FIG. 2. Note that such detection areas A1 and A2 may be set in terms of relative positions to the vehicle V or set with reference to locations of white lines. If the setting is performed with reference to locations of white lines, the three-dimensional object detection device 1 may utilize an existing white line recognition technique or other appropriate techniques.

In addition, the first three-dimensional object detection unit 33 recognizes sides of the set detection areas A1 and A2 (sides along the driving direction) close to the vehicle V, as grounding lines L1 and L2. Grounding lines mean in general lines where one or more three-dimensional objects contact with the ground, but in the present embodiment, the grounding lines are set in the above manner rather than being lines in contact with the ground. Note that, even in this case, experiences show that the difference does not become unduly large between the grounding lines according to the present embodiment and grounding lines intrinsically obtained from the position of the other vehicle V, thus not being problematic in practical use.

FIG. 5 is a schematic diagram illustrating an aspect of creating the differential waveform by the first three-dimensional object detection unit 33 shown in FIG. 3. As shown in FIG. 5, the first three-dimensional object detection unit 33 creates a differential waveform $DW_t$ from a portion corresponding to the detection area A1, A2 within the differential image $PD_t$ (the right-hand image in FIG. 4(b)) calculated in the alignment unit 32. In this operation, the first three-dimensional object detection unit 33 creates the differential waveform $DW_t$ in terms of directions where the three-dimensional object falls down. Note that the description is made only with reference to the detection area A1 for convenience, but another differential waveform $DW_t$ will also be created for the detection area A2 in a similar procedure.

More specifically describing the above, the first three-dimensional object detection unit 33 initially defines a line La on one of directions where the three-dimensional object falls down, over data of the differential image $DW_t$. The first three-dimensional object detection unit 33 then counts on the line La the number of differential pixels DP that exhibit certain differences. Here, the differential pixels DP that exhibit such certain differences are, if the pixel values of the differential image $DW_t$ are given by absolute values of the differences between pixel values of the bird's-eye view images $PB_t$ and $PB_{t-1}$, then pixels of which the values exceed a predetermined value, whereas if the pixel values of the differential image $DW_t$ are represented by "0"s and "1"s, then pixels that show "1"s.

After counting the number of the differential pixels DP, the first three-dimensional object detection unit 33 obtains the cross point CP of the line La and the grounding line L1. The first three-dimensional object detection unit 33 then associates the cross point CP with the number of counts and uses the position of the cross point CP as the basis for determining the position along the longitudinal axis, i.e. the position along the up-to-down direction axis in the right-hand figure of FIG. 5, while using the number of counts to determine the position along the lateral axis, i.e. the position along the left-to-right direction axis in the right-hand figure of FIG. 5, thereafter plotting a point as the number of counts for that cross point CP.

Similarly, the first three-dimensional object detection unit 33 in turn defines lines Lb, Lc . . . in directions where the three-dimensional object falls down and, for each line, counts the number of the differential pixels DP while determining the position along the longitudinal axis on the basis of the position of each cross point CP and determining the position along the lateral axis from the number of counts (the number of differential pixels DP) to plot the corresponding point. The first three-dimensional object detection unit 33 sequentially repeats the above to make a frequency distribution thereby creating the differential waveform $DW_t$ as shown in the right-hand figure of FIG. 5.

It should be appreciated that the distances overlapping the detection area A1 are different between the line La and line Lb in directions where the three-dimensional object falls down. For this reason, if the detection area A1 is filled with the differential pixels DP, the number of differential pixels DP on the line La becomes larger than that on the line Lb. Accordingly, when determining the position along the lateral axis from the number of counts, the first three-dimensional object detection unit 33 performs normalization on the basis of the distances overlapped with the detection area A1 and the lines La and Lb in directions where the three-dimensional object falls down. Specific example is mentioned where the left-hand figure of FIG. 5 includes six differential pixels DP on the line La and five differential pixels DP on the line Lb. Accordingly, when determining the position along the lateral axis from the number of counts in FIG. 5, the first three-dimensional object detection unit 33 performs the normalization such as by dividing the number of counts by the overlapping distance. This causes the differential waveform $DW_t$ to be such that approximately the same values on the differential waveform $DW_t$ are given to correspond to the lines La and Lb in directions where the three-dimensional object falls down.

After creating the differential waveform $DW_t$, the first three-dimensional object detection unit 33 calculates the movement distance from the comparison with the differential waveform $DW_{t-1}$ of one unit time earlier. That is, the first three-dimensional object detection unit 33 calculates the movement distance from a change in time regarding the differential waveform $DW_t$, $DW_{t-1}$.

Figure 6:
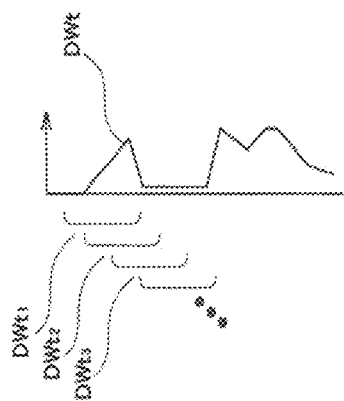
FIG. 6 is a diagram illustrating small areas divided by the first three-dimensional object detection unit shown in FIG. 3.

Description in details is now given with reference to FIG. 6, the first three-dimensional object detection unit 33 divides the differential waveform $DW_t$ into plural small areas $DW_{t1}$ to $DW_{tn}$ (where n is any integer larger than one). FIG. 6 is a diagram illustrating the small areas $DW_{t1}$ to $DW_{tn}$ divided using the first three-dimensional object detection unit 33. The small areas $DW_{t1}$ to $DW_{tn}$ are divided so as to overlap each other for example as shown in FIG. 6. For example, small area $DW_{t1}$ and small area $DW_{t2}$ partially overlap each other, and small area $DW_{t2}$ and small area $DW_{t3}$ partially overlap each other.

Subsequently, the first three-dimensional object detection unit 33 obtains an offset amount (movement amount of the differential waveform in the longitudinal axis direction (up-to-down direction in FIG. 6)) for each of the small areas $DW_{t1}$ to $DW_{tn}$. Here, the offset amount can be obtained from the difference (distance in the longitudinal axis direction) between the differential waveform $DW_{t-1}$ of one unit time earlier and the differential waveform $DW_t$ of the current time. In this operation, the first three-dimensional object detection unit 33 moves the differential waveform $DW_{t-1}$ of one unit time earlier in the longitudinal axis direction for each of the small areas $DW_{t1}$ to $DW_{tn}$ while determining the position (position along the longitudinal axis direction) where the error from the differential waveform $DW_t$ of the current time is minimum, and obtains, as the offset amount, the movement amount in the longitudinal axis direction between the original position of the differential waveform $DW_{t-1}$ and the position where the error is minimum. The first three-dimensional object detection unit 33 then counts the offset amounts obtained for the small areas $DW_{t1}$ to $DW_{tn}$ to make a histogram.

Figure 7:
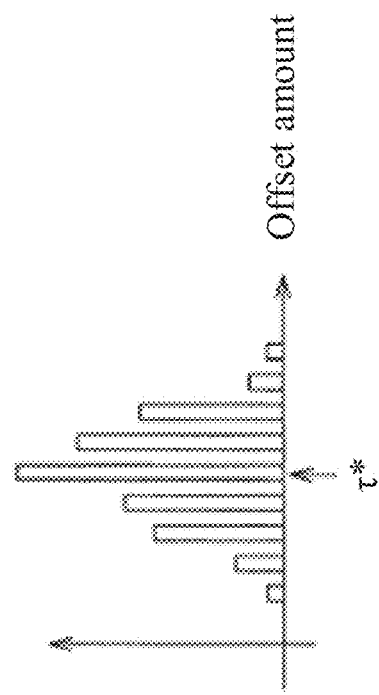
FIG. 7 is diagram illustrating one example of a histogram obtained by the first three-dimensional object detection unit shown in FIG. 3.

FIG. 7 is a diagram illustrating one example of such a histogram obtained by the first three-dimensional object detection unit 33. As shown in FIG. 7, some variation appears in the offset amounts, which are movement amounts where the error is minimum between each of the small areas $DW_{t1}$ to $DW_{tn}$ and the differential waveform $DW_{t-1}$ of one unit time earlier. For this reason, the first three-dimensional object detection unit 33 makes a histogram, which reflects variable offset amounts, and calculates the movement distance from the histogram. In this operation, the first three-dimensional object detection unit 33 calculates the movement distance of a three-dimensional object from one or more local maximum values of the histogram. More specifically in the example shown in FIG. 7, the first three-dimensional object detection unit 33 calculates the offset amount that provides a local maximum value of the histogram as a movement distance $\tau^*$. Note that this movement distance $\tau^*$ is a relative movement distance of the other vehicle V to the vehicle V. Accordingly, when calculating an absolute movement distance, the first three-dimensional object detection unit 33 will use the obtained movement distance $\tau^*$ and signals from the vehicle speed sensor 20 as the basis for calculating the absolute movement distance.

Figure 8:
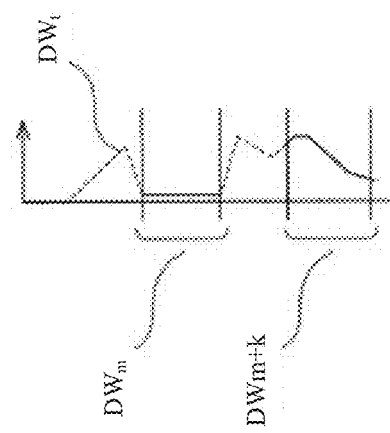
FIG. 8 is a diagram illustrating a weighting by the first three-dimensional object detection unit shown in FIG. 3.

Note also that, when making a histogram, the first three-dimensional object detection unit 33 may perform weighting each of the plural small areas $DW_{t1}$ to $DW_{tn}$, and count the offset amounts obtained for the small areas $DW_{t1}$ to $DW_{tn}$ in accordance with the weighting to make a histogram. FIG. 8 is a diagram illustrating the weighting by the first three-dimensional object detection unit 33.

As shown in FIG. 8, small area $DW_m$ (where m is an integer larger than zero and smaller than n) is flat. That is, the small area $DW_m$ is such that the difference is small between the maximum value and the minimum value of the counted number of pixels that exhibit certain differences. The first three-dimensional object detection unit 33 makes a small weighting for such small area $DW_m$. This is because the flat small area $DW_m$ has few features and may thus be highly possible to result in considerable errors when the offset amount is calculated.

On the other hand, small area $DW_{m+k}$ (where k is an integer not larger than (n–m)) is undulating. That is, the small area $DW_m$ is such that the difference is large between the maximum value and the minimum value of the counted number of pixels that exhibit certain differences. The first three-dimensional object detection unit 33 makes a large weighting for such small area $DW_m$. This is because the undulating small area $DW_{m+k}$ has remarkable features and may thus be highly possible to allow for accurate calculation. Weighting in such a manner may improve the accuracy in calculating the movement distance.

Note that the above-described embodiment divides the differential waveform $DW_t$ into plural small areas $DW_{t1}$ to $DW_{tn}$ in order to improve the accuracy in calculating the movement distance, but another embodiment may not divide the differential waveform $DW_t$ into small areas $DW_{t1}$ to $DW_{tn}$ if less accuracy is required for calculating the movement distance. In this case, the first three-dimensional object detection unit 33 will calculate the movement distance from the offset amount of the differential waveform $DW_t$ when the error is minimum between the differential waveform $DW_t$ and the differential waveform $DW_{t-1}$. That is, the method of obtaining an offset amount between the differential waveform $DW_{t-1}$ of one unit time earlier and the differential waveform $DW_t$ of the current time is not limited to the above contents.

Referring again to FIG. 3, the computing device 30 comprises smear detection unit 34. The smear detection unit 34 detects a smear occurring area from the captured image data obtained by the camera 10 capturing an image. Note that smear is whiteout phenomenon caused in a CCD image sensor and other sensors, and therefore the smear detection unit 34 may be omitted if a camera 10 is employed which uses a CMOS image sensor or other appropriate sensor which causes no smear.

Figure 9:
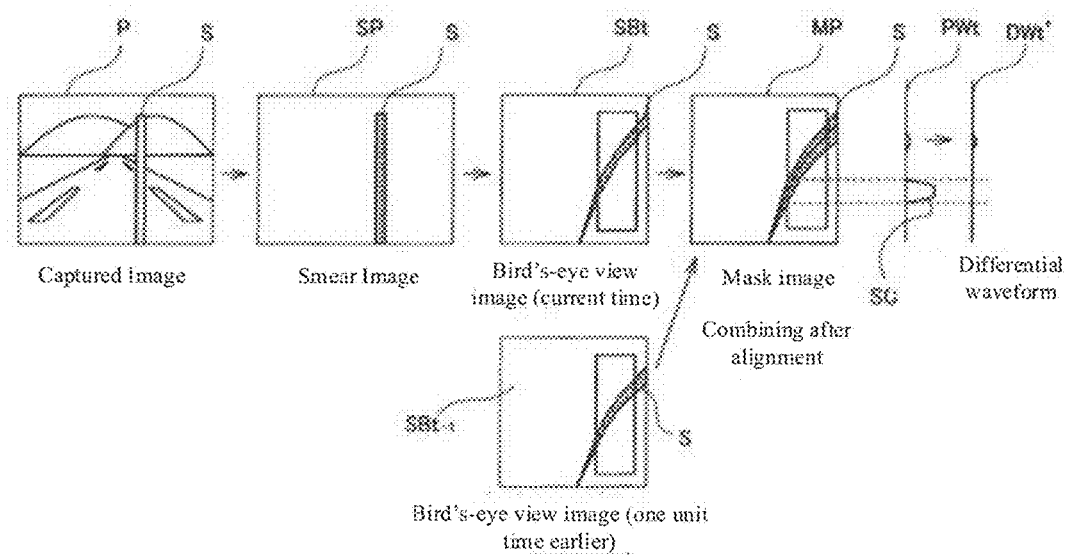
FIG. 9 is a diagram illustrating a process by a smear detection unit shown in FIG. 3 and a calculation process for the differential waveform by the same.

FIG. 9 is an image diagram for explaining a process by the smear detection unit 34 and a calculation process for the differential waveform $DW_t$ by the same. It is assumed that the smear detection unit 34 is input thereto with data of a captured image P where smear S is present. In this situation, the smear detection unit 34 detects the smear S from the captured image P. While various detection methods exist for the smear S, the smear S occurs only downward in the image from the light source if a common CCD (Charge-Coupled Device) camera is used, for example. Accordingly, the present embodiment searches for an area that has luminance values of a predetermined value or more upward in the image from the image lower side to specify this area as the occurring area of the smear S.

In addition, the smear detection unit 34 generates data of a smear image SP in which occurrence locations of the smear S are assigned with pixel values of "1"s and the other locations are assigned with pixel values of "0"s. After the generation, the smear detection unit 34 transmits data of the smear image SP to the viewpoint conversion unit 31. Further, the viewpoint conversion unit 31 input thereto with data of the smear image SP subjects this data to the viewpoint conversion into a state of bird's-eye view. The viewpoint conversion unit 31 thereby generates data of smear bird's-eye view image $SB_t$. After the generation, the viewpoint conversion unit 31 transmits data of the smear bird's-eye view image $SB_t$ to the alignment unit 33. In addition, the viewpoint conversion unit 31 transmits data of smear bird's-eye view image $SB_{t-1}$ of one unit time earlier to the alignment unit 33.

The alignment unit 33 performs alignment of the smear bird's-eye view images $SB_t$ and $SB_{t-1}$ by data processing. Specific alignment is similar to the case of performing the alignment of the bird's-eye view images $PB_t$ and $PB_{t-1}$ by data processing. In addition, after the alignment, the alignment unit 33 implements the logical OR operation over the occurrence areas of smears S in the smear bird's-eye view images $SB_t$ and $SB_{t-1}$. This allows the alignment unit 33 to generate data of a mask image MP. After the generation, the alignment unit 33 transmits data of the mask image MP to the first three-dimensional object detection unit 33.

The first three-dimensional object detection unit 33 sets to zero the number of counts in the frequency distribution with respect to locations corresponding to the occurrence areas of the smear S within the mask image MP. That is, if differential waveform $DW_t$ as shown in FIG. 9 is created, then the first three-dimensional object detection unit 33 will set to zero the number of counts SC caused by the smear S to re-create corrected differential waveform $DW_t'$.

Note that the first three-dimensional object detection unit 33 in the present embodiment obtains the movement speed of the vehicle V (camera 10) and uses the obtained movement speed to obtain an offset amount for a stationary object. After obtaining the offset amount for the stationary object, the first three-dimensional object detection unit 33 sets aside the offset amount for the stationary object among local maximum values of the histogram and then calculates the movement distance of a three-dimensional object.

Figure 10:
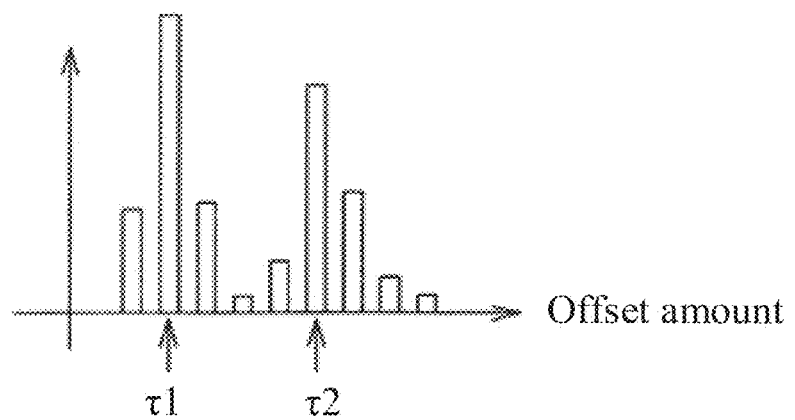
FIG. 10 is a diagram illustrating another example of histogram obtained by the first three-dimensional object detection unit shown in FIG. 3.

FIG. 10 is a diagram illustrating another example of histogram obtained by the first three-dimensional object detection unit 33. If a stationary object is present other than the other vehicle V within the field angle of the camera 10, then two local maximum values τ1 and τ2 appear. In this case, either one of the two local maximum values τ1 and τ2 represents an offset amount derived from the stationary object. Accordingly, the first three-dimensional object detection unit 33 obtains an offset amount for the stationary object from the movement speed, ignores the local maximum value representing that offset amount, and employs the remaining other local maximum value to calculate the movement distance of the three-dimensional object.

Note that, after the offset amount derived from a stationary object is ignored, if plural local maximum values still exist, then plural other vehicles V are supposed to be present within the field angle of the camera 10. However, it is extremely rare that plural other vehicles V are present within the detection area A1, A2. Therefore, the first three-dimensional object detection unit 33 aborts the calculation of the movement distance.

Figure 11:
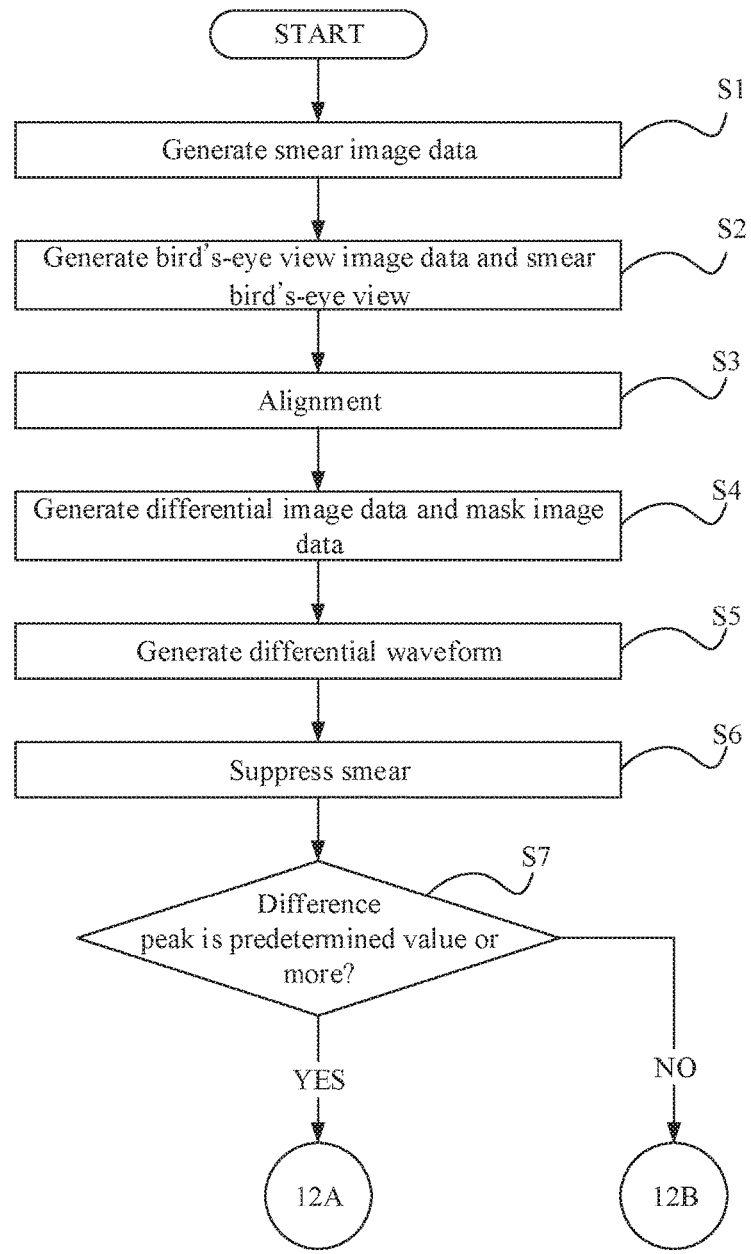
FIG. 11 is a flowchart (part 1) illustrating a three-dimensional object detection method which is performed by a viewpoint conversion unit, the alignment unit, the smear detection unit and the first three-dimensional object detection unit shown in FIG. 3 and which uses differential waveform information.

The description will then be directed to a three-dimensional object detection procedure based on the differential waveform information. FIG. 11 and FIG. 12 depict a flowchart illustrating the three-dimensional object detection procedure according to the present embodiment. As shown in FIG. 11, the computing device 30 is initially input thereto with data of captured image P obtained by the camera 10, followed by the smear detection unit 34 generating smear image SP (S1). The viewpoint conversion unit 31 then uses data of the captured image P from the camera 10 to generate data of bird's-eye view image $PB_t$ and uses data of the smear image SP to generate data of smear bird's-eye view image $SB_t$ (S2).

The alignment unit 33 then performs alignment between data of the bird's-eye view image $PB_t$ and data of bird's-eye view image $PB_{t-1}$ of one unit time earlier and also performs alignment between data of the smear bird's-eye view image $SB_t$ and data of smear bird's-eye view image $SB_{t-1}$ of one unit time earlier (S3). After these alignments, the alignment unit 33 generates data of differential image $PD_t$ and generates data of mask image MP (S4). Thereafter, the first three-dimensional object detection unit 33 uses data of the differential image $PD_t$ and data of differential image $PD_{t-1}$ of one unit time earlier to create differential waveform $DW_t$ (S5). After creating the differential waveform $DW_t$, the first three-dimensional object detection unit 33 sets to zero the number of counts corresponding to the occurrence area of smear S within the differential waveform $DW_t$ thereby to suppress the effect from the smear S (S6).

Subsequently, the first three-dimensional object detection unit 33 judges whether or not the peak of the differential waveform $DW_t$ is a first threshold value α or more (S7). This first threshold value α is set by the three-dimensional object judgment unit 38, which will be described later in detail. Here, if the peak of the differential waveform $DW_t$ is less than the first threshold value α, i.e. there is little difference, then it may be considered that no three-dimensional object is present within the captured image P. Therefore, if the peak of the differential waveform $DW_t$ is judged to be less than the first threshold value α (S7: NO), the first three-dimensional object detection unit 33 judges that no three-dimensional object is present and no other vehicle is present (FIG. 12: S16). The process shown in FIG. 11 and FIG. 12 is thus completed.

If, on the other hand, the peak of the differential waveform $DW_t$ is judged to be the first threshold value α or more (S7: YES), the first three-dimensional object detection unit 33 judges that a three-dimensional object is present and divides the differential waveform $DW_t$ into plural small areas $DW_{t1}$ to $DW_{tn}$ (S8). Subsequently, the first three-dimensional object detection unit 33 performs weighting for each of the small areas $DW_{t1}$ to $DW_{tn}$ (S9). The first three-dimensional object detection unit 33 then calculates an offset amount for each of the small areas $DW_{t1}$ to $DW_{tn}$ (S10) and makes a histogram in consideration of the weighting. (S11).

Thereafter, the first three-dimensional object detection unit 33 uses the histogram as the basis for calculating the relative movement distance (S12), which is the movement distance of the three-dimensional object relative to the vehicle V. The first three-dimensional object detection unit 33 then uses the relative movement distance to calculate the absolute movement speed of the three-dimensional object (S13). During this calculation, the first three-dimensional object detection unit 33 differentiates the relative movement distance with respect to time to calculate the relative movement speed, and adds thereto with the speed of the vehicle detected by the vehicle speed sensor 20 to calculate the absolute movement speed.

Subsequently, the first three-dimensional object detection unit 33 judges whether or not the absolute movement speed of the three-dimensional object is 10 km/h or more and the relative movement speed of the three-dimensional object to the vehicle V is +60 km/h or less (S14). If both the conditions are satisfied (S14: YES), the first three-dimensional object detection unit 33 judges that the three-dimensional object is other vehicle V (S15). The process shown in FIG. 11 and FIG. 12 is thus completed. If, on the other hand, at least ether one of the conditions is not satisfied (S14: NO), the first three-dimensional object detection unit 33 judges that no other vehicle is present (S16). The process shown in FIG. 11 and FIG. 12 is thus completed.

Note that the present embodiment provides the detection areas A1 and A2 behind the vehicle V and focuses on whether or not to have a possibility of coming into contact if the vehicle changes lanes. To this end, the process of step S14 is performed. That is, assuming that the system in the present embodiment is operated on an expressway and the speed of a three-dimensional object is less than 10 km/h, even if the other vehicle V is present, problems are unlikely to occur because the other vehicle V will have been positioned far behind the vehicle V at the time of changing lanes. Similarly, if the relative movement speed of a three-dimensional object to the vehicle V exceeds +60 km/h (i.e. if a three-dimensional object moves with a speed faster than that of the vehicle V by more than 60 km/h), then problems are also unlikely to occur because the other vehicle V will have moved forward from the vehicle V at the time of changing lanes. Thus, step S14 may also be said as judging therein other vehicle V which is problematic at the time of changing lanes.

In addition, by judging in step S14 whether the absolute movement speed of a three-dimensional object is 10 km/h or more and the relative movement speed of the three-dimensional object to the vehicle V is +60 km/h or less, the following advantageous effects are obtained. For example, due to the error in mounting the camera 10, the absolute movement speed of a stationary object may possibly be detected as being several km/h. Hence, judging whether the absolute movement speed is 10 km/h or more allows for reducing the possibility that a stationary object is judged as the other vehicle V. In addition, noise may raise the possibility that the relative movement speed of a stationary object to the vehicle is detected as being a speed more than +60 km/h. Therefore, by judging whether the relative movement speed is +60 km/h or less, the possibility of false detection due to noise can be reduced.

Further, the process of step S14 may be substituted by judging that the absolute movement speed is not of negative and/or not of zero km/h. In addition, the present embodiment focuses on whether or not to have a possibility of coming into contact if the vehicle changes lanes, and it may thus be possible to sound warning tone to the driver of the vehicle or present an indication equivalent to warning by an appropriate indication device when the other vehicle V is detected in step S15.

Thus, according to the detection procedure for a three-dimensional object based on the differential waveform information in this example, the number of pixels exhibiting certain differences over data of the differential image $PD_t$ is counted along directions, where the three-dimensional object falls down due to the viewpoint conversion, to make a frequency distribution thereby creating the differential waveform $DW_t$. The pixels exhibiting certain differences over data of the differential image $PD_t$ as used herein are pixels which have changed in images of different times, and in other words, may be said as representing a location where the three-dimensional object was present. For this reason, in the location where the three-dimensional object was present, the number of pixels is to be counted along directions where the three-dimensional object falls down, to make a frequency distribution thereby creating the differential waveform $DW_t$. In particular, the number of pixels is counted along directions where the three-dimensional object falls down, and therefore, the differential waveform $DW_t$ is to be created for the three-dimensional object from information regarding the height direction. The movement distance is then calculated from a change in time of the differential waveform $DW_t$ including information regarding the height direction. Therefore, compared with a case such as where attention is merely on the movement of one point, the detected location before the change in time and the detected location after the change in time tend to be the same location on the three-dimensional object because they are specified to include information regarding the height direction. This allows the movement distance to be calculated from the change in time of the same location thereby improving the accuracy in calculating the movement distance.

In addition, the number of counts in the frequency distribution is set to zero for locations of the differential waveform $DW_t$ corresponding to the occurrence area of smear S. The portions of the differential waveform $DW_t$ caused by the smear S are thereby removed, and the smear S may be prevented from being misidentified as a three-dimensional object.

Moreover, the movement distance of a three-dimensional object is calculated from the offset amount of the differential waveform $DW_t$ when the error is minimized between differential waveforms $DW_t$ created at different times. This allows the movement distance to be calculated from the offset amount as one-dimensional information regarding waveform thereby to suppress the calculation cost when the movement distance is calculated.

Furthermore, each of differential waveforms $DW_t$ created at different times is divided into plural small areas $DW_{t1}$ to $DW_{tn}$. Dividing into such plural small areas $DW_{t1}$ to $DW_{tn}$ allows plural waveforms to be obtained which represent respective locations on the three-dimensional object. In addition, offset amounts are obtained which present minimum errors of respective waveforms in the areas $DW_{t1}$ to $DW_{tn}$, and a histogram is made by counting the offset amounts obtained in the areas $DW_{t1}$ to $DW_{tn}$ and thereby used for calculating the movement distance of a three-dimensional object. Thus, the offset amounts are obtained for respective locations on the three-dimensional object, and the movement distance is obtained from plural offset amounts and can thus be calculated in high accuracy.

Further, weighting is performed for each of plural small areas $DW_{t1}$ to $DW_{tn}$, and a histogram is made by counting, in accordance with the weighting, the offset amounts obtained in the areas $DW_{t1}$ to $DW_{tn}$. Therefore, a large weighting is employed for areas having specific features while a small weighting is employed for areas having few features, so that the movement distance can be more appropriately calculated. Thus, the accuracy in calculating the movement distance can further be improved.

Further, with respect to each small area $DW_{t1}$ to $DW_{tn}$ of the differential waveform $DW_t$, weighting is made large as the difference becomes large between the maximum value and the minimum value of the counted number of pixels that exhibit certain differences. Thus, a large weighting is made for an area having specific features of undulating where the difference is large between the maximum value and the minimum value, while a small weighting is made for a flat area having less undulation. In this respect, by making large weighting as the difference becomes large between the maximum value and the minimum value, the accuracy in calculating the movement distance can further be improved, because an accurate offset amount is more easily obtained for an area having large undulation from the aspect of its shape than a flat area.

Further, the movement distance of a three-dimensional object is calculated from the local maximum value of a histogram obtained by counting offset amounts which are obtained for the small areas $DW_{t1}$ to $DW_{tn}$. Therefore, even if some variation occurs in the offset amounts, the local maximum value allows the movement distance to be calculated in higher accuracy.

Further, the offset amount is also obtained for a stationary object and ignored, and therefore, a situation can be prevented where the accuracy in calculating the movement distance of a three-dimensional object is deteriorated due to the stationary object. In addition, after the offset amount for the stationary object is ignored, if plural local maximum values still exist, then the calculation for the movement distance of the three-dimensional object is aborted. Therefore, a situation can be prevented where a false movement distance, such as having plural local maximum values, is calculated.

Note that the above-described embodiment judges the vehicle speed of the vehicle V on the basis of signals from the vehicle speed sensor 20, but the present invention is not limited thereto, and the speed may alternatively be estimated from plural images at different times. In this case, no vehicle speed sensor is required, and the configuration can be simplified.

Further, in the embodiment described above, a captured image of the current time and a captured image of one unit time earlier are converted into bird's-eye views, the converted bird's-eye views are positional aligned with each other before being used for generating the differential image $PD_t$, and the generated differential image $PD_t$ is evaluated along a tilted or falling-down direction (the direction in which a three-dimensional object is tilted or falls down due to the conversion of the captured images into the bird's-eye view) to create the differential waveform $DW_t$. However, the present invention is not limited thereto. For example, the differential waveform $DW_t$ may be created by converting only the image of one unit time earlier into a bird's-eye view with subsequent aligning, and then re-converting the converted bird's-eye view into an image equivalent to the captured image, generating a differential image from that image and the image of the current time, and evaluating the generated differential image along equivalent directions of tilt (i.e. directions obtained by converting the falling-down direction into the captured image). That is, bird's-eye views may not necessarily be definitely generated if it is possible to perform alignment with respect to the image of the current time and the image of one unit time earlier, generate the differential image $PD_t$ from differences between both the aligned images, and evaluate the differential image $PD_t$ along the falling-down directions when the differential image $PD_t$ would be converted to a bird's-eye view.

In the above embodiment, as shown in FIG. 4(b), after the positional alignment between the bird's-eye view image data PBt at the current time and the bird's-eye view image data PBt−1 one unit time before (i.e. past), a differential image PDt of these is produced, and, as shown in FIG. 5, by evaluating the differential image PDt along a direction equivalent or corresponding to the tilted direction, the differential wave form DW1 is generated. However, alternatively, by evaluating the bird's-eye view data PBt at the current time and the bird's eye view one unit time earlier respectively, along a direction equivalent to the tilted direction as shown in FIG. 5 to generate the differential waveforms DWt at present and at the one time earlier separately, these two differential waveforms may then undergo positional alignment as shown in FIG. 4(b) so that a final differential waveform information based on these differential waveforms will be generated.

<<Detection of Three-Dimensional Object Based on Edge Information>>

Figures 13A, 13B:
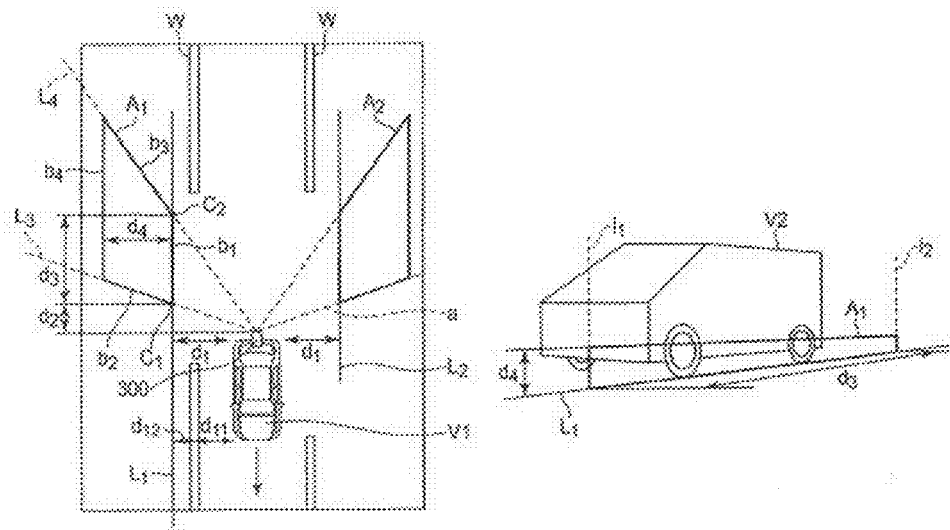

The description will then be directed to the three-dimensional object detection blocks utilizing edge information, which are comprised of the viewpoint conversion unit 31, the luminance difference calculation unit 35, the edge line detection unit 36 and the second three-dimensional object detection unit 37. FIGS. 13A and 13B are diagrams illustrating an image capturing range and other items, wherein FIG. 13(a) is a plan view and FIG. 13(b) is a perspective view in real space behind a vehicle V1. As shown in FIG. 13(a), the camera 10 is made to have a certain field angle "a" and captures an image included in this certain field angle "a" behind the vehicle V1. The field angle "a" of the camera 10 is set, like the case shown in FIG. 2, such that the capturing range of the camera 10 includes the lane where the vehicle V1 is driving as well as neighboring lanes.

Detection areas A1 and A2 in this example are formed in trapezoidal shapes in planer view (state of bird's-eye view), and the positions, sizes and shapes of these detection areas A1 and A2 are determined on the basis of distances $d_1$ to $d_4$. Note that the detection areas A1 and A2 in the example shown in the figure is not limited to being trapezoidal shapes, and may also be other shapes such as rectangles in a state of bird's-eye view as shown in FIG. 2.

Here, the distance d1 is a distance from the vehicle V1 to grounding line L1, L2. The grounding line L1, L2 means a line in which a three-dimensional object, which is present on a lane neighboring the lane where the vehicle V1 is driving, contacts with the ground. The present embodiment is for the purpose of detecting other vehicle V2 etc. (including two-wheel vehicle or the like) which is driving behind the vehicle V1 and on the right or left lane neighboring the lane for the vehicle V1. For this reason, the distance d1, which defines the position of the grounding line L1, L2 of the other vehicle V2, may be predetermined as being approximately fixed using distance d11 from the vehicle V1 to white line W and distance d12 from the white line W to a position where the other vehicle V2 is predicted to be driving.

Further, the distance d1 is not limited to being fixedly predetermined and may also be variable. In this case, the computing device 30 recognizes the position of the white line relative to the vehicle V1 by using any white line recognition technique or other appropriate techniques, and determines the distance d11 on the basis of the recognized position of white line W. The distance d1 is thereby variably set using the determined distance d11. In the present embodiment below, the distance d1 is assumed to be fixedly predetermined because the position where the other vehicle V2 is driving (distance d12 from white line W) and the position where the vehicle V1 is driving (distance d11 from white line W) are approximately established.

The distance d2 is a distance extending from the rear-end portion of the vehicle 1 in the vehicle movement direction. This distance d2 is determined such that the detection areas A1 and A2 fall at least within the field angle "a" of the camera 10. Particularly in the present embodiment, the distance d2 is set so as to contact with an area sectioned with the field angle "a" of the camera 10. The distance d3 is a distance that represents the length of the detection area A1, A2 in the vehicle movement direction. This distance d3 is determined on the basis of the size of a three-dimensional object as an object to be detected. The object to be detected is the other vehicle V2 or the like in the present embodiment, and the distance d3 is thus set to be a length including the other vehicle V2.

The distance d4 is a distance that represents a height set to include a tire of the other vehicle V2 etc. in real space, as shown in FIG. 13(b). The distance d4 is to be a length in the bird's-eye view, as shown in FIG. 13(a). Note that the distance d4 may be a distance that includes right or left neighboring lane in the bird's-eye view but does not include next neighboring lane (i.e. two-lane neighboring lane). This is because, if the next neighboring lane is included, it is indistinguishable whether the other vehicle V2 is present on the right or left neighboring lane to the own lane where the vehicle V1 is driving or the other vehicle V2 is present on the next neighboring lane.

The distance d1 to distance d4 are determined in the above manner, and the position, size and shapes of the detection areas A1, A2 are thereby determined. More specifically, the distance d1 determines the position of upper base b1 of the trapezoidal detection area A1, A2. The distance d2 determines starting point position C1 of the upper base b1. The distance d3 determines end point position C2 of the upper base b1. Leg b2 of the trapezoidal detection area A1, A2 is determined by straight line L3 which extends from the camera 10 beyond the starting point position C1. Similarly, leg b3 of the trapezoidal detection area A1, A2 is determined by straight line L4 which extends from the camera 10 beyond the end point position C2. The distance d4 determines the position of lower base b4 of the trapezoidal detection area A1, A2. Thus, the area surrounded by the bases and sides b1 to b4 is to be the detection area A1, A2. This detection area A1, A2 is to be a right trapezoid (rectangular) in real space behind the vehicle V1, as shown in FIG. 13(b).

Referring again to FIG. 3, the viewpoint conversion unit 31 is input thereto with captured image data of a predetermined area, which was obtained by the camera 10 capturing an image. The viewpoint conversion unit 31 performs viewpoint conversion process on the input captured image data to output bird's-eye view image data in a state of bird's-eye view. The state of bird's-eye view as used herein is a state of being viewed from the above, such as from the viewpoint of a virtual camera looking down vertically (or slightly obliquely downward). This viewpoint conversion may be performed using the technique described in Japanese Published Patent Application No. 2008-219063, for example.

In order to detect edge lines of a three-dimensional object included in the bird's-eye view image, the luminance difference calculation unit 35 calculates a luminance difference for the bird's-eye view image data subjected to the viewpoint conversion by the viewpoint conversion unit 31. The luminance difference calculation unit 35 calculates, in terms of plural positions along a vertical virtual line extending in the vertical direction in real space, a luminance difference between two pixels in the vicinity of each position. The luminance difference calculation unit 35 can calculate the luminance difference by using either of an approach which sets only one vertical virtual line extending in the vertical direction in real space and an approach which sets two vertical virtual lines.

Specific approach will be described in which two vertical virtual lines are set. For the bird's-eye view image subjected to the viewpoint conversion, the luminance difference calculation unit 35 sets a first vertical virtual line that represents a line segment extending in the vertical direction in real space and a second vertical virtual line that is different from the first vertical virtual line and represents a line segment extending in the vertical direction in real space. The luminance difference calculation unit 35 sequentially obtains luminance differences between points on the first vertical virtual line and points on the second vertical virtual line along the first vertical virtual line and the second vertical virtual line. The operation of the luminance difference calculation unit 35 will hereinafter be described in detail.

Figures 14A, 14B:
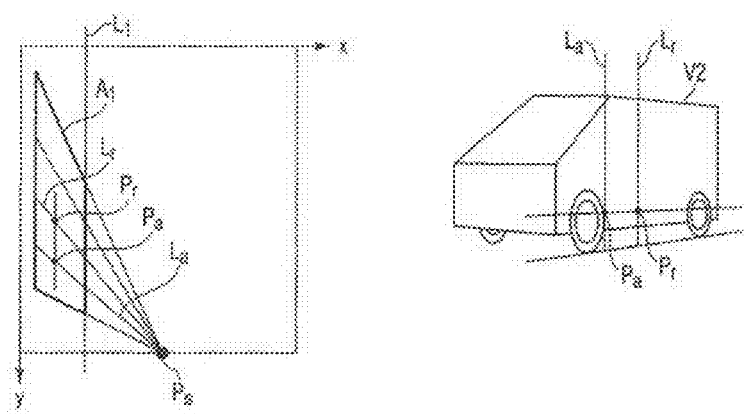

As shown in FIG. 14(a), the luminance difference calculation unit 35 sets a first vertical virtual line La (hereinafter referred to as "attention line La") which represents a line segment extending in the vertical direction in real space and which passes through the detection area A1. In addition, the luminance difference calculation unit 35 sets a second vertical virtual line Lr (hereinafter referred to as "reference line Lr"), different from the attention line La, which represents a line segment extending in the vertical direction in real space and which passes through the detection area A1. Here, the reference line Lr is set at a position separated from the attention line La by a predetermined distance in real space. Note that lines representing line segments extending in the vertical direction in real space as used herein are to be lines extending radially from the position Ps of the camera 10 in the bird's-eye view image. Such radially extending lines are lines along the directions in which a three-dimensional object falls down or is tilted when being converted into the bird's-eye view.

The luminance difference calculation unit 35 sets an attention point Pa on the attention line La (a point on the first vertical virtual line). In addition, the luminance difference calculation unit 35 sets a reference point Pr on the reference line Lr (a point on the second vertical virtual line). These attention line La, attention point Pa, reference line Lr and reference point Pr are to be of the relationship shown in FIG. 14(b) in real space. Apparent from FIG. 14(b), the attention line La and the reference line Lr are lines extending in the vertical direction in real space, and the attention point Pa and the reference point Pr are points set at approximately the same height in real space. Note that the attention point Pa and the reference point Pr are not necessarily required to be of strictly the same height, and an error is allowable with such an extent as the attention point Pa and the reference point Pr would be deemed as being of the same height.

The luminance difference calculation unit 35 obtains the luminance difference between the attention point Pa and the reference point Pr. If the luminance difference between the attention point Pa and the reference point Pr is large, then an edge is considered to exist between the attention point Pa and the reference point Pr. Accordingly, the edge line detection unit 36 shown in FIG. 3 detects the edge on the basis of the luminance difference between the attention point Pa and the reference point Pr.

This aspect will be described more in detail. FIGS. 15A and 15B are diagrams illustrating the detailed operation of the luminance difference calculation unit 35, wherein FIG. 15(a) depicts a bird's-eye view image in the state of bird's-eye view and FIG. 15(b) is an enlarged view of part B1 of the bird's-eye view image shown in FIG. 15(a). Note that only the detection area A1 is illustrated also in FIG. 15(a) and described, but the luminance difference is calculated for the detection area A2 in a similar procedure as well.

If the other vehicle V2 is captured in the captured image taken by the camera 10, the other vehicle V2 appears within the detection area A1 in the bird's-eye view image, as shown in FIG. 15(a). As shown in FIG. 15(b), which depicts the enlarged view of the area B1 in FIG. 15(a), the attention line La is assumed to be set on the rubber portion of a tire of the other vehicle V2 in the bird's-eye view image. In this condition, the luminance difference calculation unit 35 initially sets the reference line Lr. The reference line Lr is set along the vertical direction and at a position separated from the attention line La by a predetermined distance in real space. Specifically in the three-dimensional object detection device 1 according to the present embodiment, the reference line Lr is set at a position separated from the attention line La by 10 cm in real space. In the bird's-eye view image, the reference line Lr is thereby set on the wheel of the tire of the other vehicle V2 separated from the rubber of the tire of the other vehicle V2 by a distance equivalent to 10 cm, for example.

The luminance difference calculation unit 35 then sets plural attention points Pa1 to PaN on the attention line La. In FIG. 15(b), for convenience of explanation, six attention points Pa1 to Pa6 (hereinafter referred simply to as "attention point Pai" if indicating any of the points) are set. Note that the number of attention points Pa set on the attention line La may be freely selected. The following description will proceed with the assumption that N attention points Pa are set on the attention line La.

The luminance difference calculation unit 35 then sets reference points Pr1 to PrN to be of the same heights as those of respective attention points Pa1 to PaN in real space. Thereafter, the luminance difference calculation unit 35 calculates the luminance difference between each attention point Pa and corresponding reference point Pr which have the same height. The luminance difference calculation unit 35 thereby calculates the luminance difference between each two pixels for each of the plural points (1 to N) along the vertical virtual line extending in the vertical direction in real space. For example, the luminance difference calculation unit 35 is to calculate the luminance difference between the first attention point Pa1 and the first reference point Pr1 and then calculate the luminance difference between the second attention point Pa2 and the second reference point Pr2. Thus, the luminance difference calculation unit 35 sequentially obtains luminance differences along the attention line La and the reference line Lr. That is, the luminance difference calculation unit 35 will sequentially obtain luminance differences between the third to the N-th attention points Pa3 to PaN and the third to the N-th reference points Pr3 to PrN.

The luminance difference calculation unit 35 iteratively performs processes, such as the above setting the reference line Lr, setting the attention points Pa and the reference points Pr and calculation of luminance differences, while shifting the attention line La within the detection area A1. That is, the luminance difference calculation unit 35 iteratively performs the above processes while changing each position of the attention line La and the reference line Lr by the same distance in the extending direction of the grounding line L1 in real space. For example, the luminance difference calculation unit 35 will set as an attention line La the line having been the reference line Lr in the previous process, set a new reference line Lr for that attention line La, and thus sequentially obtain luminance differences.

Referring again to FIG. 3, the edge line detection unit 36 detects an edge line from sequential luminance differences calculated by the luminance difference calculation unit 35. For example, in the case shown in FIG. 15(b), the luminance difference is small between the first attention point Pa1 and the first reference point Pr1 because they are positioned on the same tire portion. In contrast, the second to sixth attention points Pa2 to Pa6 are positioned on the rubber portion of the tire, while the second to sixth reference points Pr2 to Pr6 are positioned on the wheel portion of that tire. Therefore, the luminance differences are large between the second to sixth attention points Pa2 to Pa6 and the second to sixth reference points Pr2 to Pr6. Thus, the edge line detection unit 36 can detect that an edge line exists between the second to sixth attention points Pa2 to Pa6 and the second to sixth reference points Pr2 to Pr6 which exhibit large luminance differences.

Specifically, when detecting an edge line, the edge line detection unit 36 initially determines the attribute of the i-th attention point Pai from the luminance difference between the i-th attention point Pai (coordinate $(xi, yi)$) and the i-th reference point Pri (coordinate $(xi', yi')$) according to Expression 1 below.

If $I(xi,yi) > I(xi',yi') + t$, then $s(xi,yi) = 1$, if $I(xi,yi) < I(xi',yi') - t$, then $s(xi,yi) = -1$, otherwise $s(xi,yi) = 0$. (Expression 1)

In the above Expression 1, t represents a threshold value, $I(xi, yi)$ represents the luminance value of the i-th attention point Pai, and I(xi', yi') represents the luminance value of the i-th reference point Pri. According to the above Expression 1, if the luminance value of the attention point Pai is larger than that of the reference point Pri added with the threshold value t, then the attribute s(xi, yi) of the attention point Pai is "1". If, on the other hand, the luminance value of the attention point Pai is smaller than that of the reference point Pri subtracted therefrom the threshold value t, then the attribute s(xi, yi) of the attention point Pai is "−1". If the relationship between the luminance value of the attention point Pai and the luminance value of the reference point Pri are other than the above, then the attribute s(xi, yi) of the attention point Pai is "0".

The edge line detection unit 36 then uses Expression 2 below as the basis for determining whether the attention line La is an edge line or not from the continuity c(xi, yi) of the attributes s along the attention line La.

If $s(xi,yi)=s(xi+1,yi+1)$(excluding 0=0), then $c(xi,yi)=1$, otherwise $c(xi,yi)=0$.          (Expression 2)

If the attribute s(xi, yi) of the attention point Pai and the attribute s(xi+1, yi+1) of the neighboring attention point Pai+1 are the same, then the continuity c(xi, yi) is "1". If the attribute s(xi, yi) of the attention point Pai and the attribute s(xi+1, yi+1) of the neighboring attention point Pai+1 are not the same, then the continuity c(xi, yi) is "0".

The edge line detection unit 36 then obtains the total sum in terms of the continuity c for all the attention points Pa on the attention line La. The edge line detection unit 36 divides the obtained total sum of the continuity c by the number N of the attention points Pa to thereby normalize the continuity c. If the normalized value exceeds a threshold value θ, the edge line detection unit 36 judges that the attention line La is an edge line. Note that the threshold value θ is a value preliminarily set from experiments or other appropriate means.

In other words, the edge line detection unit 36 uses Expression 3 below as the basis for judging whether the attention line La is an edge line or not. Further, the edge line detection unit 36 judges for all the attention lines La presented on the detection area A1 whether or not to be an edge line.

$\Sigma c(xi,yi)/N > \theta$          (Expression 3)

Referring again to FIG. 3, the second three-dimensional object detection unit 37 detects a three-dimensional object on the basis of the amount of edge lines detected by the edge line detection unit 36. As described in the above, the three-dimensional object detection device 1 according to the present embodiment detects edge lines extending in the vertical direction in real space. Detecting more edge lines extending in the vertical direction suggests a higher possibility that a three-dimensional object is present in the detection area A1, A2. For this reason, the second three-dimensional object detection unit 37 detects a three-dimensional object on the basis of the amount of edge lines detected by the edge line detection unit 36. In addition, the second three-dimensional object detection unit 37 determines whether an edge line detected by the edge line detection unit 36 is correct or not before detecting a three-dimensional object. The second three-dimensional object detection unit 37 determines whether or not the luminance change along an edge line regarding a bird's-eye view image on the edge line is larger than a threshold value. If the luminance change of the bird's-eye view image on the edge line is larger than the threshold value, then that edge line is judged to be detected due to erroneous determination. If, on the other hand, the luminance change of the bird's-eye view image on the edge line is not larger than the threshold value, then that edge line is determined to be correct. Note that this threshold value is a value preliminarily set from experiments or other appropriate means.

FIGS. 16A and 16B are diagrams illustrating luminance distributions of edge lines, wherein FIG. 16(a) depicts an edge line and the luminance distribution when the other vehicle V2 as a three-dimensional object is present in the detection area A1, and FIG. 16(b) depicts an edge line and the luminance distribution when no three-dimensional object is present in the detection area A1.

As shown in FIG. 16(a), it is assumed that the attention line La set on the tire rubber portion of the other vehicle V2 in the bird's-eye view image was determined to be an edge line. In this case, the luminance change of the bird's-eye view image on the attention line La is gentle. This is because the captured image by the camera 10 is subjected to the viewpoint conversion into the bird's-eye view image thereby causing the tire of the other vehicle V2 to be elongated in the bird's-eye view image. On the other hand, as shown in FIG. 16(b), it is assumed that the attention line La set on white characters "50" painted on the road surface in the bird's-eye view image was erroneously determined. In this case, the luminance change of the bird's-eye view image on the attention line La is significantly undulating. This is because portions having higher luminance in white characters are mixed in with portions having lower luminance, such as road surface, on the edge line.

The second three-dimensional object detection unit 37 uses the difference as described above between luminance distributions on the attention line La as the basis for determining whether or not an edge line is detected due to erroneous determination. If the luminance change along an edge line is larger than a predetermined threshold value, then the second three-dimensional object detection unit 37 determines the edge line to be detected due to erroneous determination. Further, that edge line is not to be used for detecting a three-dimensional object. The accuracy in detecting a three-dimensional object is thereby suppressed from deteriorating due to erroneous determination that white characters, such as "50", on the road surface and weeds on the road shoulder etc. are determined as edge lines.

Specifically, the second three-dimensional object detection unit 37 calculates the luminance change of an edge line according to either of Expressions 4 and 5 below. This luminance change of an edge line represents an evaluation value in the vertical direction in real space. Expression 4 below evaluates the luminance distribution by using the sum value of squares of differences each between the i-th luminance value I(xi, yi) and the neighboring (i+1)-th luminance value I(xi+1, yi+1) on the attention line La. Expression 5 below evaluates the luminance distribution by using the sum value of absolute values of differences each between the i-th luminance value I(xi, yi) and the neighboring (i+1)-th luminance value I(xi+1, yi+1) on the attention line La.

Evaluation value in a direction equivalent to the vertical direction=$\Sigma[\{I(xi,yi)-I(xi+1,yi+1)\}^2]$          (Expression 4)

Evaluation value in a direction equivalent to the vertical direction=$\Sigma|I(xi,yi)-I(xi+1,yi+1)|$          (Expression 5)

Note, however, that Expression 5 may be substituted by Expression 6 below wherein attributes b of neighboring luminance values are binarized using a threshold value t2 and those binarized attributes b are summed up with respect to all the attention points Pa.

Evaluation value in a direction equivalent to the vertical direction=$\Sigma b(xi,yi)$ where, if $|I(xi,yi)-I(xi+1,yi+1)|>t2$, then $b(xi,yi)=1$, otherwise $b(xi,yi)=0$. (Expression 6)

If the absolute value of the luminance difference between the luminance value of an attention point Pai and the luminance value of a reference point Pri is larger than the threshold t2, then the attribute b(xi, yi) of that attention point Pa(xi, yi) is "1". Otherwise, the attribute b(xi, yi) of an attention point Pa(xi, yi) is "0". This threshold value t2 is preliminarily set from experiments or other appropriate means in order to determine that an attention line La is not present on the same three-dimensional object. Further, the second three-dimensional object detection unit 37 sums up the attributes b with respect to all the attention points Pa on the attention line La to obtain the evaluation value in a direction equivalent to the vertical direction, and determines whether the edge line is correct.

Figure 17:
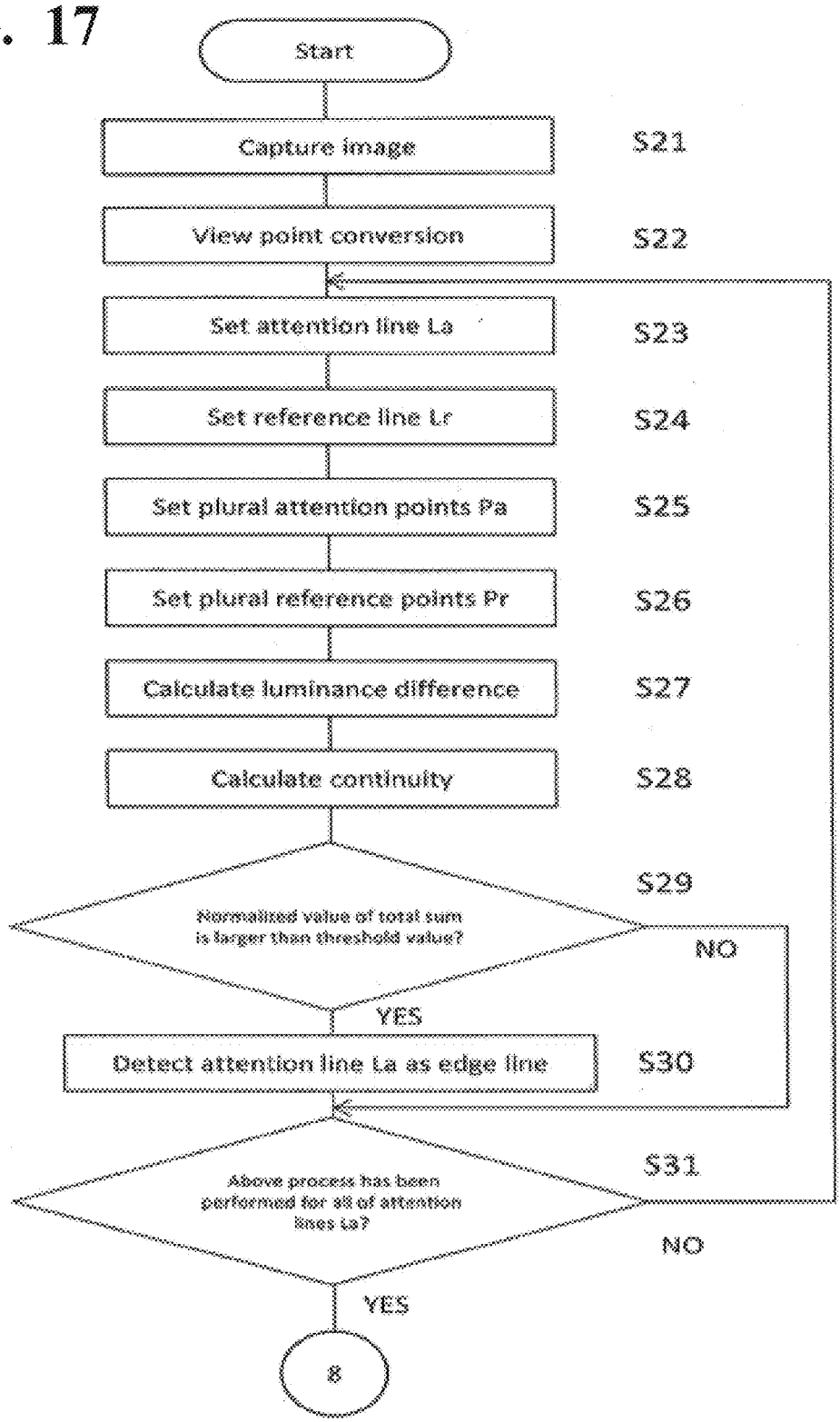
FIG. 17 is a flowchart (part 1) illustrating a three-dimensional object detection method which is performed by the viewpoint conversion unit, the luminance difference calculation unit, an edge line detection unit and a second three-dimensional object detection unit shown in FIG. 3 and which uses edge information.
Figure 18:
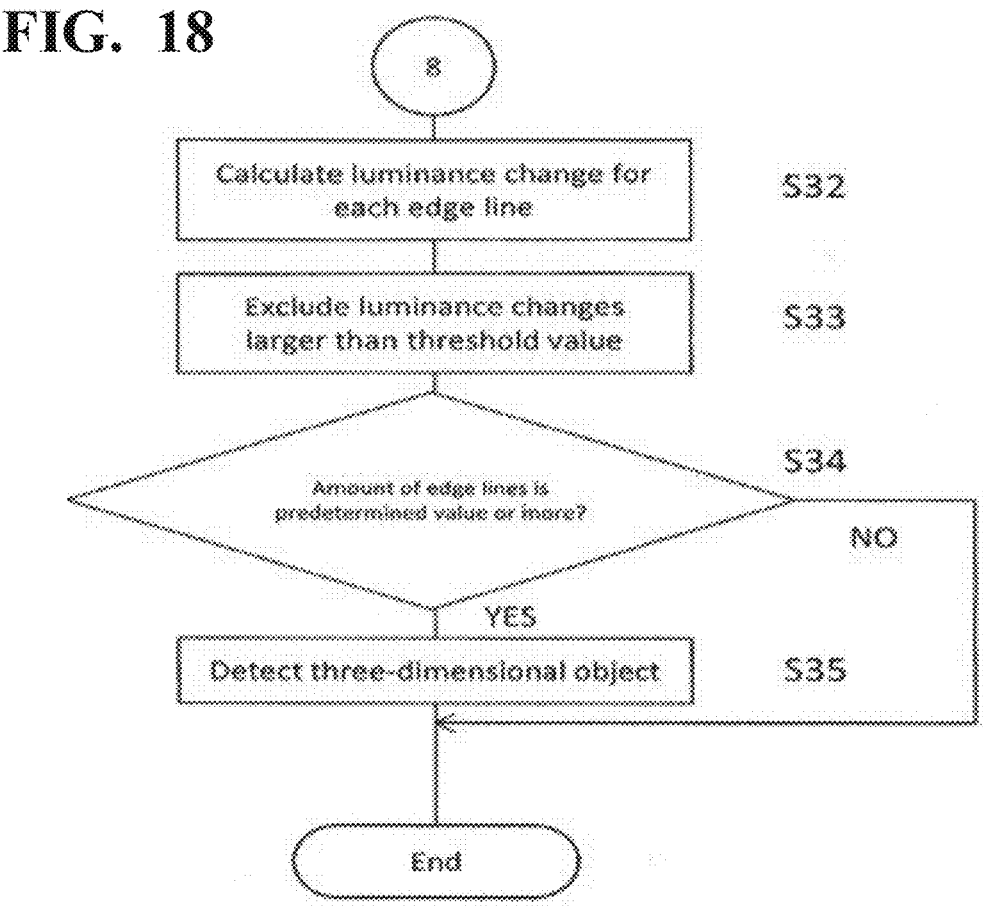
FIG. 18 is a flowchart (part 2) illustrating the three-dimensional object detection method which is performed by the viewpoint conversion unit, the luminance difference calculation unit, the edge line detection unit and the second three-dimensional object detection unit shown in FIG. 3 and which uses edge information.

The description will then be directed to a three-dimensional object detection method utilizing the edge information in accordance with the present embodiment. FIG. 17 and FIG. 18 depict a flowchart illustrating details of the three-dimensional object detection method according to the present embodiment. Note that the process is described for the detection area A1, but a similar process is performed for the detection area A2 as well.

As shown in FIG. 17, first in step S21, the camera 10 captures an image of the predetermined area specified by the field angle "a" and the mounted position. In step S22, the viewpoint conversion unit 31 is then input thereto with the captured image data captured in step S21 by the camera 10 and performs the viewpoint conversion to generate bird's-eye view image data.

In step S23, the luminance difference calculation unit 35 then sets attention line La on the detection area A1. In this setting, the luminance difference calculation unit 35 sets, as the attention line La, a line equivalent to a line extending in the vertical direction in real space. In step S24, the luminance difference calculation unit 35 then sets reference line Lr on the detection area A1. In this setting, the luminance difference calculation unit 35 sets, as the reference line Lr, a line which represents a line segment extending in the vertical direction in real space and which is separated from the attention line La in real space by a predetermined distance.

In step S25, the luminance difference calculation unit 35 then sets plural attention points Pa on the attention line La. In this setting, the luminance difference calculation unit 35 sets such a number of attention points Pa as not being problematic for the edge line detection unit 36 to detect edges. Further in step S26, the luminance difference calculation unit 35 sets reference points Pr to be of the same heights as those of the attention points Pa in real space. Each attention point Pa and corresponding reference point Pr are thereby arranged approximately in the horizontal direction, and edge lines extending in the vertical direction in real space are thus easily detected.

In step S27, the luminance difference calculation unit 35 then calculates the luminance difference between an attention point Pa and a reference point Pr which are of the same height in real space. The edge line detection unit 36 then calculates the attribute s of each attention point Pa according to the above Expression 1. In step S28, the edge line detection unit 36 then calculates the continuity c regarding the attribute s of each attention point Pa according to the above Expression 2. In step S29, the edge line detection unit 36 then determines according to the above Expression 3 whether or not the value obtained by normalizing the total sum of the continuities c is larger than the threshold θ. If the normalized value is judged to be larger than the threshold θ (S29: YES), then the edge line detection unit 36 detects the relevant attention line La as an edge line in step S30. Thereafter, the process proceeds to step S31. If the normalized value is judged not to be larger than the threshold value θ (S29: NO), then the edge line detection unit 36 does not detects the relevant attention line La as an edge line, and the process proceeds to step S31.

In step S31, the computing device 30 judges whether or not the above process from step S23 to step S30 has been performed for all of attention lines La which are allowed to be set on the detection area A1. If the above process is judged not to have been performed for all of attention lines La (S31: NO), then the process returns to step S23 and the process to step S31 is repeated while newly setting an attention line La. If, on the other hand, the above process is judged to have been performed for all of attention lines La (S31: YES), then the process proceeds to step S32 in FIG. 18.

In step S32 of FIG. 18, the second three-dimensional object detection unit 37 calculates the luminance change along each edge line, which has been detected in step S30 of FIG. 17. The second three-dimensional object detection unit 37 calculates the luminance change along the edge line according to either of the above Expressions 4, 5 and 6. In step S33, the second three-dimensional object detection unit 37 then excludes, from edge lines, one or more edge lines that exhibit luminance changes larger than a predetermined threshold. That is, edge lines exhibiting large luminance changes are determined not to be correct edge lines, and they are not to be used for detecting a three-dimensional object. This is because of, as described above, suppressing characters on the road surface and weeds on the road shoulder etc. included in the detection area A1 from being detected as edge lines. Therefore, the predetermined threshold value used herein is a value preliminarily obtained from experiments or other appropriate means and set on the basis of luminance changes caused by characters on the road surface and weeds on the road shoulder etc.

In step S34, the second three-dimensional object detection unit 37 then judges whether or not the amount of edge lines is a second threshold value β or more. Note that this second threshold value β is a value set after being preliminarily obtained from experiments or other appropriate means, which is set by the three-dimensional object judgment unit 38 as will be described later. For example, if four-wheel vehicles are set as three-dimensional objects to be detected, the second threshold value β is set using experiments or other appropriate means on the basis of the number of edge lines of a four-wheel vehicle which would appear in the detection area A1. If the amount of edge lines is determined to be the second threshold value β or more (S34: YES), then the second three-dimensional object detection unit 37 detects in step S35 that a three-dimensional object is present in the detection area A1. If, on the other hand, the amount of edge lines is determined not to be the second threshold value β or more (S34: NO), then the second three-dimensional object detection unit 37 determines that no three-dimensional object is present in the detection area A1. Thereafter, the process shown in FIG. 17 and FIG. 18 is thus completed.

As described heretofore, according to the three-dimensional object detection method in the present embodiment utilizing edge information, in order to detect a three-dimensional object present in the detection area A1, A2, a vertical virtual line for the bird's-eye view image is set as being a line segment extending in the vertical direction in real space. Thereafter, for each position of plural positions along the vertical virtual line, a luminance difference is calculated between two pixels in the vicinity of that position, and the continuity regarding the luminance difference can be used as the basis for determining the presence or absence of a three-dimensional object.

Specifically, attention line La and reference line Lr are set for the detection area A1, A2 in the birds-eye view image, wherein the attention line La represents a line segment extending in the vertical direction in real space, and the reference line Lr is different from the attention line La. Thereafter, luminance differences between attention points Pa on the attention line La and reference points Pa on the reference line Lr are sequentially obtained along the attention line La and the reference line Lr. Thus, sequentially obtaining luminance differences between points and points also allows the luminance difference to be obtained between the attention line La and the reference line Lr. A larger luminance difference between the attention line La and the reference line Lr provides a higher possibility that an edge of a three-dimensional object is present at the set location of the attention line La. The three-dimensional object is thereby detected on the basis of the sequential luminance differences. In particular, even if a three-dimensional object is expanded in accordance with the height from the road surface due to the conversion into the birds-eye view image when the three-dimensional object is subjected to the luminance comparison in terms of vertical virtual lines extending in the vertical direction in real space, the detection process for the three-dimensional object is not affected therefrom. Therefore, according to the method in this example, the accuracy in detecting a three-dimensional object can be improved.

Moreover, in this example, the luminance difference is obtained between two points with approximately the same height near the vertical virtual line. Specifically, the luminance difference is obtained between each attention point Pa on the attention line La and corresponding reference point Pr on the reference line Lr, which are of approximately the same height in real space. Therefore, the luminance difference can be determinately detected for the case where an edge extending in the vertical direction is present.

Figure 19:
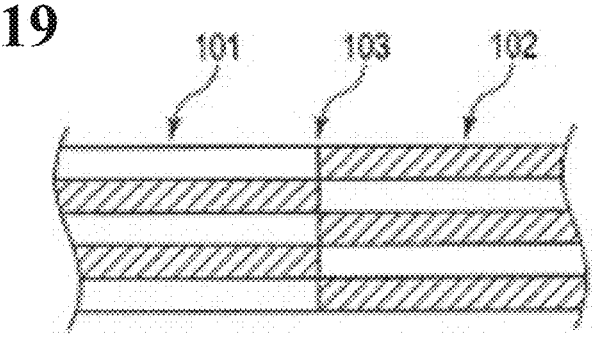
FIG. 19 is a diagram illustrating an image example for explaining an edge detection operation.

Furthermore, in this example, luminance differences between attention points Pa on the attention line La and reference points Pa on the reference line Lr are used as the basis for determining attributes of these attention points Pa, and the continuity of these attributes along the attention line La is used as the basis for determining whether that attention line La is an edge line. Therefore, a boundary between an area with high luminance and an area with low luminance is detected as an edge line, so that the edge detection can be performed along human's native sensibility. This advantageous effect will be described in detail. FIG. 19 is a diagram illustrating an image example for explaining the process in the edge line detection unit 36. This image example represents an image in which a first stripe pattern 101 and a second stripe pattern 102 are bordering each other, wherein the first stripe pattern 101 is such that high luminance areas and low luminance areas are alternated, while the second stripe pattern 102 is such that low luminance areas and high luminance areas are alternated. In addition, this image example is such that the high luminance areas in the first stripe pattern 101 are bordering the low luminance areas in the second stripe pattern 102 while the low luminance areas in the first stripe pattern 101 are bordering the high luminance areas in the second stripe pattern 102. Site 103 located on the border between the first stripe pattern 101 and the second stripe pattern 102 tends not to be perceived as an edge by human's sensibility.

In this respect, if an edge is to be detected in terms only of luminance difference, that site 103 will be recognized as being an edge because the low luminance areas are bordering the high luminance areas. In contrast, the edge line detection unit 36 determines the site 103 as an edge only if a continuity regarding the attribute of the relevant luminance difference is present in addition to the luminance difference at the site 103. Therefore, the edge line detection unit 36 can avoid such erroneous determination as recognizing as an edge line the site 103, which is not to be recognized as an edge by human's sensibility, and can perform the edge detection along human's sensibility.

Further, in this example, if the luminance change on an edge line detected by the edge line detection unit 36 is larger than a predetermined threshold value, then that edge line is judged to be detected due to erroneous determination. When the captured image obtained by the camera 10 is converted into the bird's-eye view image, a three-dimensional object included in that captured image tends to appear in a state of being extended in the bird's-eye view image. For example, as described above, when the tire of the other vehicle V2 is extended, the luminance change of the bird's-eye view image in the extended direction tends to be small because the tire as one part is extended. In contrast, if characters painted on the road or other inappropriate objects are erroneously determined as edge lines, then the birds-eye view image will include areas having higher luminance, such as character portions, and areas having lower luminance, such as road surface portions, mixed in with each other. In this case, the luminance change in the extended direction tends to be large. Therefore, by determining the luminance change of the bird's-eye view image along an edge line in accordance with this example, an edge line detected due to erroneous determination can be recognized, and the accuracy in detecting a three-dimensional object can thus be enhanced.

<<Final Judgment for Three-Dimensional Object>>

Referring again to FIG. 3, in order to take advantage of the two three-dimensional object detection units 33 and 37 to detect a three-dimensional object, the three-dimensional object detection device 1 in this example comprises the three-dimensional object judgment unit 38 and the threshold value setting unit 39. The three-dimensional object judgment unit 38 finally judges whether an object is a three-dimensional object or not from the detection result by the first three-dimensional object detection unit 33 and the detection result by the second three-dimensional object detection unit 37. The threshold value setting unit 39 sets the first threshold value α used in the first three-dimensional object detection unit 33 and the second threshold value β used in the second three-dimensional object detection unit 37 in response to the brightness in the detection area A1, A2 detected by the brightness detection unit 40.

The brightness detection unit 40 reads therein the amount of light from the detection area A1, A2 detected by the camera 10, or control values of the camera 10, such as shutter speed, aperture value and gain value, which are controlled by the camera 10 in itself on the basis of the detected amount of light, from the camera 10 and outputs them to the threshold value setting unit 39. Detecting as the brightness the amount of light from the detection area A1, A2 allows for performing a threshold value setting control in response to the actual brightness in the environment. In addition, or alternatively, detecting the control values of the camera 10 based on the amount of light allows the threshold values to be set in line with the actually captured image and along the characteristics of three-dimensional object detection. Note that, as substitute for detecting the light amount from the detection area A1, A2 and/or the control values etc, the brightness detection unit 40 may calculate an altitude of the sun from the time and the longitude of the current position and use this as the brightness. Using the solar altitude as the detected value of brightness allows the detection situation for the road surface to be close to the actual situation, and the threshold values can be set along the characteristics of three-dimensional object detection.

The threshold value setting unit 39 sets the weighting for the detection result from the second three-dimensional object detection unit 37 to be increased as the brightness detected by the brightness detection unit 40 decreases, while setting the weighting for the detection result from the first three-dimensional object detection unit 33 to be decreased as the brightness increases. That is, the weighting for the detection result based on the edge information is increased for dark detection environment, while the weighting for the detection result based on the differential waveform information is increased for bright environment. Specifically, the ratio $\alpha/\beta$ of the first threshold value $\alpha$ to the second threshold value $\beta$ is set to be increased as the brightness detected by the brightness detection unit 40 is darker or decreases, while the ratio $\alpha/\beta$ is set to be decreased as the brightness is brighter or increases.

Figure 21:
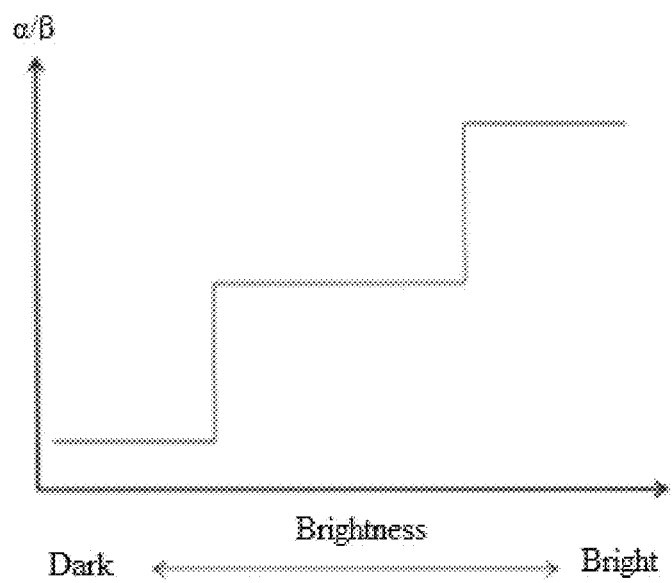
FIG. 21 is one example of control map illustrating the relationship of the ratio α/β of a first threshold value and a second threshold value with respect to the brightness.
Figure 22:
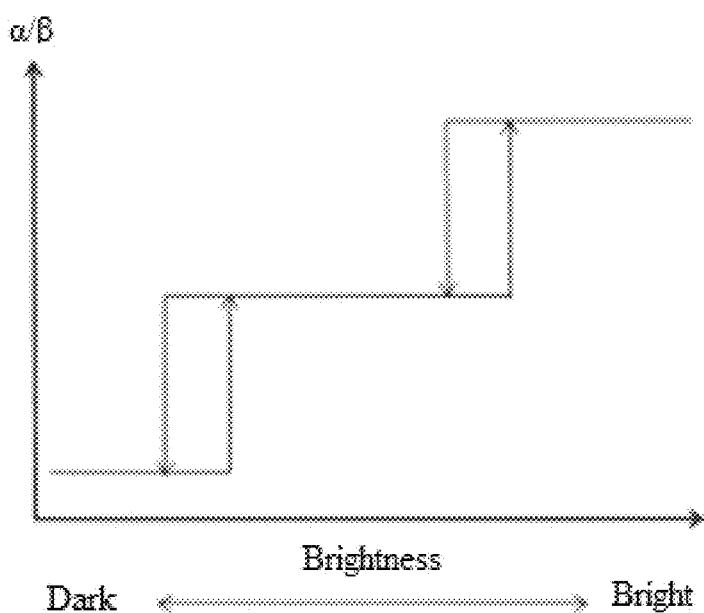
FIG. 22 is another example of control map illustrating the relationship of the ratio α/β of the first threshold value and the second threshold value with respect to the brightness.
Figure 23:
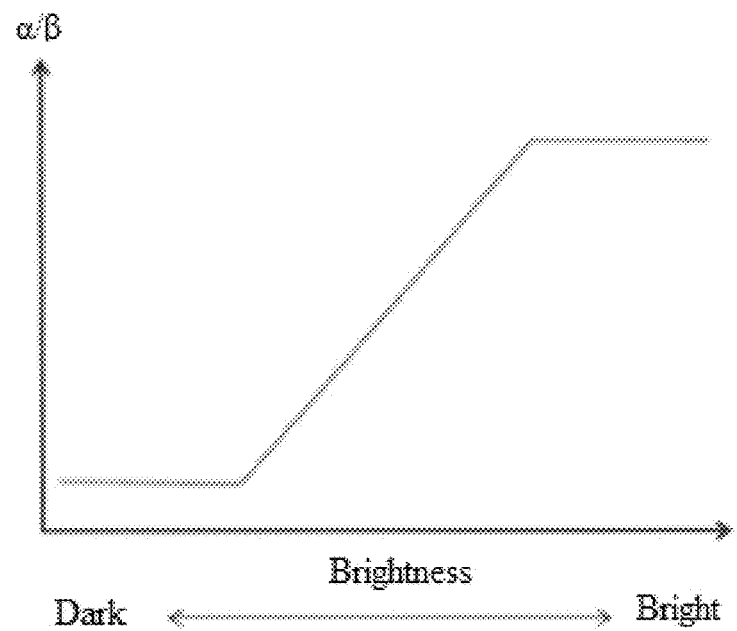
FIG. 23 is further example of control map illustrating the relationship of the ratio α/β of the first threshold value and the second threshold value with respect to the brightness.
Figure 24:
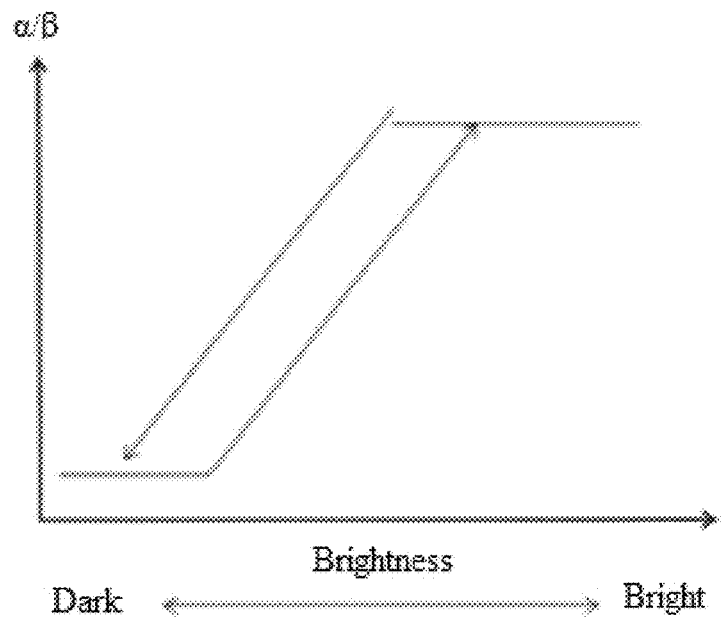
FIG. 24 is still further example of control map illustrating the relationship of the ratio α/β of the first threshold value and the second threshold value with respect to the brightness.

FIG. 21 to FIG. 24 are control maps illustrating setting examples for the ratio $\alpha/\beta$ of the first threshold value $\alpha$ and the second threshold value $\beta$ with respect to the brightness. FIG. 21 illustrates an example in which the ratio $\alpha/\beta$ is increased in a stepwise manner as the brightness increases, and FIG. 22 illustrates an example in which the ratio $\alpha/\beta$ is also increased in a stepwise manner as the brightness increases, but which is provided with hysteresis in order to prevent hunting in the control. Further, FIG. 23 illustrates an example in which the ratio $\alpha/\beta$ is proportionally increased as the brightness increases, and FIG. 24 illustrates an example in which the ratio $\alpha/\beta$ is also proportionally increased as the brightness increases, but which is provided with hysteresis in order to prevent hunting in the control.

Figure 25:
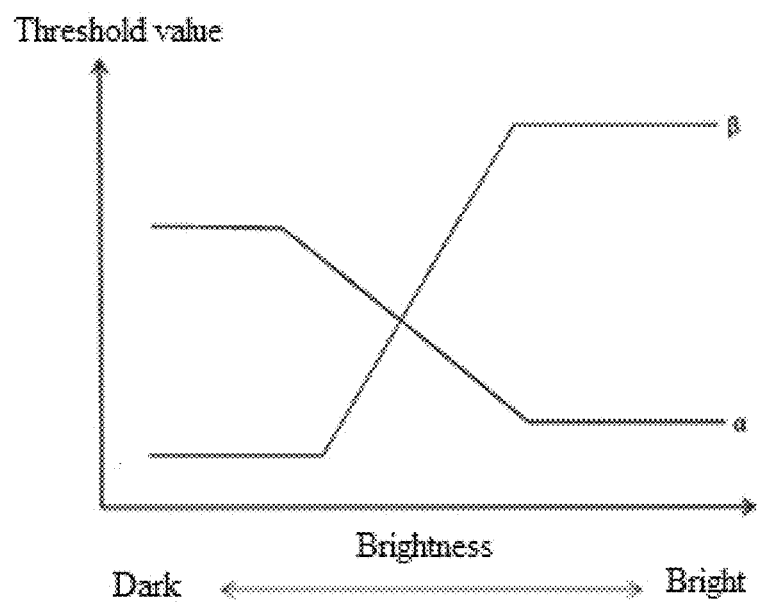
FIG. 25 is a control map in which the first threshold value α and the second threshold value β are set independently from each other.

In the control map shown in FIGS. 21 to 24, setting examples of the ratio $\alpha/\beta$, i.e., the first threshold value $\alpha$ to the second threshold value $\beta$ have been shown. However, the first threshold value $\alpha$ and the second threshold value $\beta$ may be set independently of each other. FIG. 25 represents a control map in which the first threshold value $\alpha$ and the second threshold value $\beta$ are set independently from each other. The first threshold $\alpha$ is set to decrease while the second threshold value $\beta$ is set to increase as brightness becomes brighter. In this case, only one of the first threshold value $\alpha$ and the second threshold value $\beta$ may be controlled. For example, while the second threshold $\beta$ may be set constant, the first threshold $\alpha$ may be set to decrease. Further, it may also be conceivable such that, when the brightness becomes brighter than a predetermined value, by setting the second threshold value $\beta$ to a value greater than the detection limit, it is possible to perform the detection of a three-dimensional object by only the first three-dimensional object detection unit 33.

Figure 26:
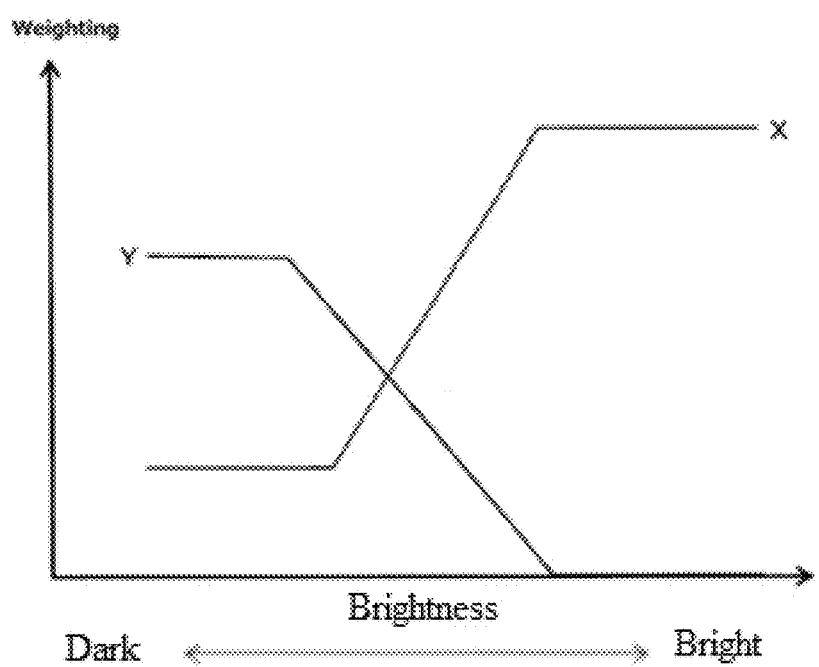
FIG. 26 is a control map illustrating the weighting of the detection result by the first three-dimensional object detection unit and the weighting of the detection result by the second three-dimensional object detection unit.

FIG. 26 is a control map illustrating the weighting X of the detection result by the first three-dimensional object detection unit 33 and the weighting Y of the detection result by the second three-dimensional object detection unit 37. As the brightness is darker, the weighting X of the detection result by the first three-dimensional object detection device 33 is set smaller while the weighting Y of the detection result by the second three-dimensional object detection unit Y is set larger. In contrast, in accordance with the brightness is brighter, the weighing X of the detection result by the first three-dimensional object detection unit 33 is set larger while the weighting Y of the detection result by the second three-dimensional object detection unit 37 is set smaller such that, in particular when the brightness exceeds a predetermined value, the weighting of Y will be set to zero. In other words, within this range, a three-dimensional object is detected only by the first three-dimensional object detection unit 33.

When the detection environment is dark such as in the night, the lighting condition for the road surface is affected, such as by street-lamps and headlights, to significantly change, and the three-dimensional object detection method utilizing the differential waveform information thus involves a possibility of false detection. However, even if such bright-and-dark variation occurs on the road surface due to lightning, the three-dimensional object detection method utilizing the edge information is little affected because edges may not necessarily appear on the road surface. Therefore, when the detection environment is dark, the weighting for the detection result based on the edge information is increased to thereby allow for enhancing the accuracy in detecting a three-dimensional object. In contrast, when the detection environment is bright such as in the daytime, markings on the road surface and edges of objects on the road shoulder are determinately detected, and the three-dimensional object detection method utilizing the edge information thus involves a possibility of false detection. However, the three-dimensional object detection method utilizing the differential waveform information is little affected by such markings on the road surface and edges of objects on the road shoulder. Therefore, when the detection environment is bright, the weighting for the detection result based on the differential waveform information is increased to thereby allow for enhancing the accuracy in detecting a three-dimensional object.

Figure 20:
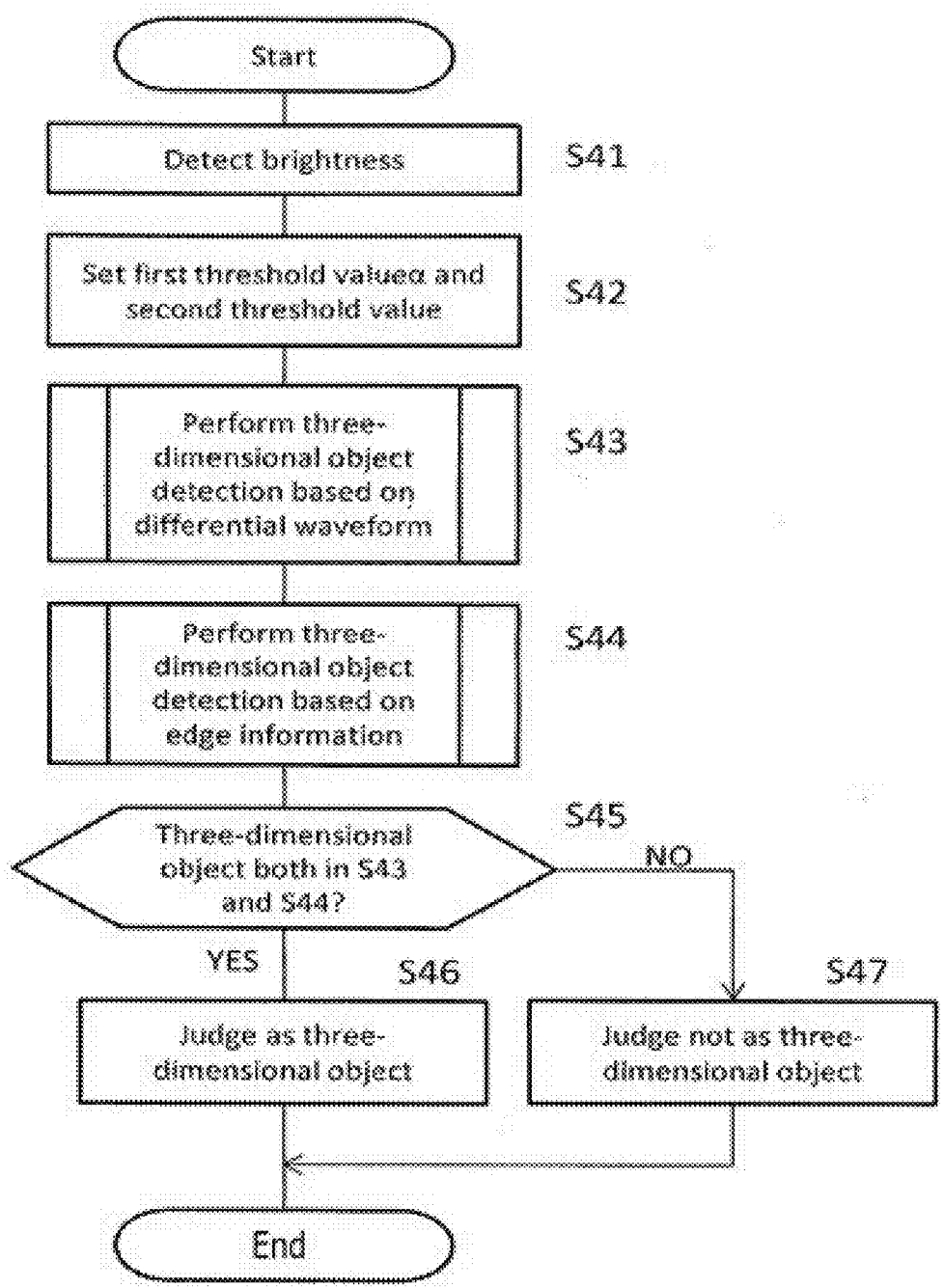
FIG. 20 is a flowchart illustrating the control procedure in a three-dimensional object judgment unit shown in FIG. 3.

The description will proceed with reference to FIG. 20 to the operation of the three-dimensional object judgment unit 38 and the threshold value setting unit 39. First in step S41, the brightness detection unit 40 detects the brightness in the detection area A1, A2 to output it to the threshold value setting unit 39. In step S42, the threshold value setting unit 39 uses the detected brightness and a preliminarily stored control map as shown in either of FIG. 21 to FIG. 24 to calculate the first threshold value $\alpha$ and the second threshold value $\beta$, and outputs them to the first three-dimensional object detection unit 33 and the second three-dimensional object detection unit 37. The first threshold value $\alpha$ and the second threshold value $\beta$ can be obtained by appropriately prorating the initial values $\alpha_0$ and $\beta_0$ to be the ratio $\alpha/\beta$ obtained from the control map as shown in FIGS. 21 to 24, for example.

In step S43, the three-dimensional object detection based on the differential waveform information is performed in the above-described procedure. Further in step S44, the three-dimensional object detection based on the edge information is performed in the above-described procedure. During the three-dimensional object detection based on the differential waveform information and the three-dimensional object detection based on the edge information, the first threshold value α and the second threshold value β both in response to the brightness are set in the first three-dimensional object detection unit 33 and the second three-dimensional object detection unit 37, respectively.

In step S45, it is judged whether or not an object was detected as a three-dimensional object in step S43 and the object was further detected as a three-dimensional object in step S44. If the object was detected as a three-dimensional object in both the steps S43 and S44, then the process proceeds to step S46 to finally judge that the object is a three-dimensional object. If the object was not detected as a three-dimensional object in at least either one of steps S43 and S44, then the process proceeds to step S47 to finally judge that the object is not a three-dimensional object.

As described above, when the detection environment is dark such as in the night, the three-dimensional object detection device 1 in this example increases the weighting for the detection result based on the edge information relative to the detection result based on the differential waveform information, which involves a possibility of false detection due to being affected such as by street-lamps and headlights, and the accuracy in detecting a three-dimensional object can thus be enhanced. In contrast, when the detection environment is bright such as in the daytime, the weighting for the detection result based on the differential waveform information is increased relative to the detection result based on the edge information, which involves a possibility of false detection due to markings on the road surface and edges of objects on the road shoulder, and the accuracy in detecting a three-dimensional object can thus be enhanced.

Incidentally, when generating differential waveform information by the alignment unit 32 and the first three-dimensional object detection unit 33 in FIG. 3, in the embodiment described above, as shown in FIG. 4, based on the movement speed of the own or host vehicle, a positional alignment is executed by shifting the bird's-eye view image at the current time and the bird's-eye view image one unit time earlier by a movement distance in real space. Then, a deference image is obtained in that state to generate differential wave form information therefrom. However, the method described below may be used as well.

That is, in a differential image obtained by offsetting the captured images at different timings, an pixel amount corresponding to a feature point of a moving object (the number of pixels indicating the difference) becomes great. On the other hand, in a differential image obtained from the captured images at different timings, which are not offset, the pixel amount corresponding to the feature point of a stationary object becomes great. Thus, in the present embodiment, by comparing the pixel value (edge amount) of the differential image of the captured images which have been taken at different timings and subsequent offsetting to the pixel value (edge amount) of the differential image of the captured images which have been taken at different timings without subsequent offsetting, it is determined whether the three-dimensional object is a stationary object or a moving object.

As shown in FIG. 7(*a*), at the timing T0 in the past, the image Q(T0) of a three-dimensional object is detected in the detection region A1, A2. At the timing T1, i.e. at the present timing after the timing T0, when an image Q(T1) of the three-dimensional object is detected in the detection areas A1, A2, since the own vehicle V, the detecting entity, moves in the direction B, on the image, the three-dimensional image Q(T0) detected at the past timing T0 moves to an upper side position of the three-dimensional object Q(T1) in the detection areas A1, A2.

Then, as shown in FIG. 27(*b*), the distribution of pixels or edge component of the image Q (T1) of the three-dimensional object detected at the current time T1, the distribution of pixels or edge components of the image Q(T0A) obtained by offsetting the image Q(T0) detected at the past timing T0 by a predetermined amount, and the distribution of pixels or edge components of the image Q(T0B) obtained without offsetting the image Q(T0) detected at the past timing T0 are acquired, respectively.

As shown in FIG. 27(*b*), when comparing the image T1 and the offset images T0A, the position of the image of the three-dimensional object in the image T1 and the position of the image Q(T0A) in the image T0A (the position of the host vehicle along the moving direction B) are almost the same. On the other hand, as shown in the same figure, when comparing the image T1 and the image T0B, i.e. non-offset image, the position of the image Q(T1) of the three-dimensional object in the image T1 and that of the image Q(T0B) of the three-dimensional image in the image T0B (i.e. the position of the host vehicle along the moving direction) are different. In other words, when acquiring a differential image between T1 and T0A, the common parts are not left by subtraction so that the number of pixels to be extracted as a feature or characteristics is small. On the other hand, when obtaining a differential image between T1 and T0B, different parts will remain so that the number of pixels extracted as feature points are relatively large.

Figure 28A:
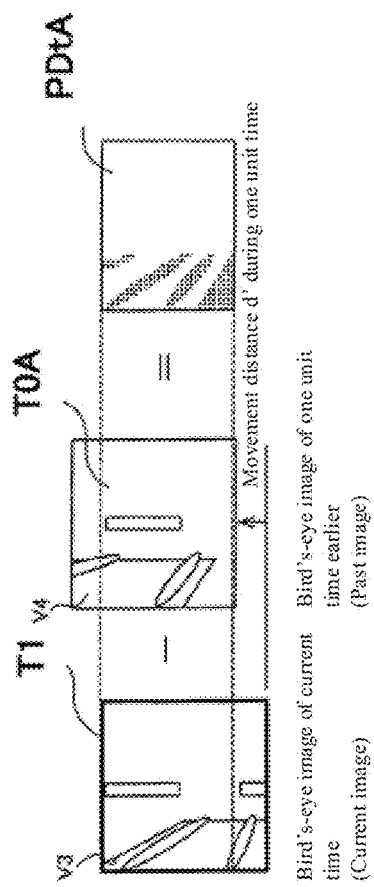
FIGS. 28A and 28B illustrate a case of a moving, three-dimensional object.
Figure 28B:
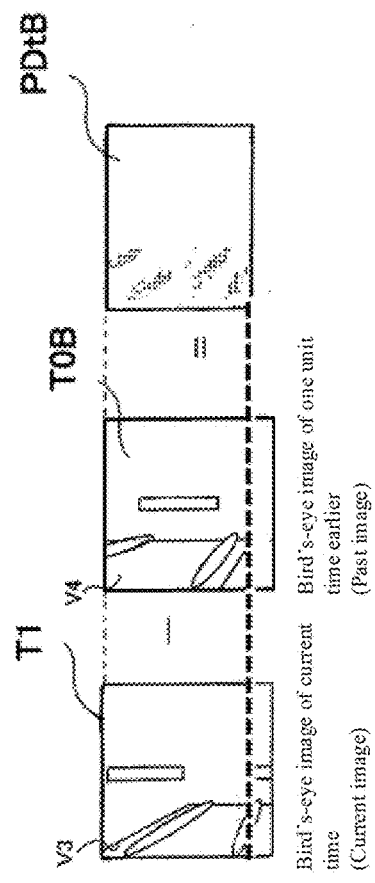
Figure 29A:
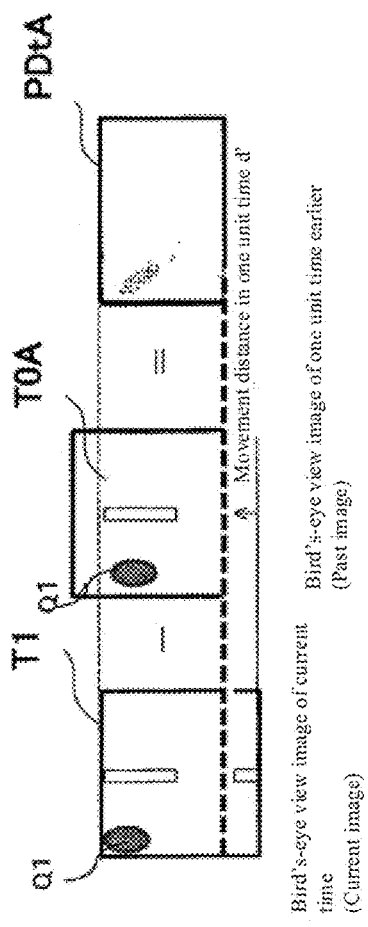
FIGS. 29A and 29B illustrate a case of a stationary, three-dimensional object.
Figure 29B:
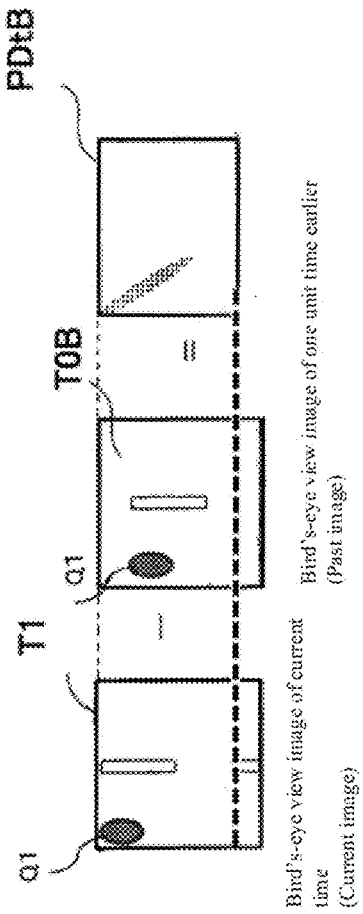

Considering whether a three-dimensional object is a moving object or a stationary object, a focus or attention point shown in FIG. 27 is now described. A case of a moving, three-dimensional object is described with reference to FIGS. 28A and 28B while a case of a stationary, three-dimensional object is described with reference to FIGS. 29A and 29B.

As shown in FIG. 28(*a*), in the case in which a three-dimensional object detected is the other moving vehicle VX, since both the own vehicle V and the other vehicle VX move, there is a tendency to keep a predetermined positional relationship between own vehicle V and the other vehicle VX. That is, if the captured image is offset, the position of the other vehicle VX tends to rather deviate so that many pixels (edges) are detected which represent the feature points in the differential image PDt. On the other hand, as shown in FIG. 28(*b*), in the case of non-offset of the captured image, there is a tendency that the position of the own vehicle and that of the other vehicle VX tend to approach each other, so that, in the differential image PDt, less pixels (edges) which can present the feature points are detectable. If more pixels (edges) are present in the differential image PDt, an integrated value tends to be higher, while pixels (edges) are less in the difference waveform information, an integrated value is inclined to be lower.

Further, as shown in FIG. 29(*a*), in the case of a stationary, three-dimensional object Q1 being detected, since the stationary object Q1 remains stationary while the vehicle V is moving, the own vehicle V and the stationary object tend to be separated from each other. Put another way, if the captured image is offset, the own vehicle V and the stationary object Q1 tend to approach so that, in the differential image PDt, the pixels (edges) representing feature points are less detected. On the other hand, as shown in FIG. 29(*b*), unless the captured image is offset, the position of the stationary object Q1 has a tendency to be different from the previously captured image as the own vehicle V moves, so that more pixels (edges) representing feature points are detected in the differential image PDt. There is a tendency for integrated value in the luminance distribution information to be higher, when more pixels (edges) are present in the differential image PDt. Further, the less the pixels (edges) are present in the differential image PDt, the lower the integrated value becomes in the luminance distribution information.

The idea described above may be similarly applied to the case of using the edge information. More specifically, the position of the first bird's-eye view image obtained at a first time T0 of a three-dimensional object and the position of the second bird's-eye view image obtained at a second time T1 after the first time are aligned on the bird's-eye view, and the number of pixels are counted, which show the brightness or luminance difference more than a predetermined value between image regions adjacent to each other on the differential image of the bird's-eye view image thus aligned. Subsequently, the counted number of pixels is used to generate a frequency distribution so as to acquire a first cumulative value of the first luminance distribution information. In other words, in consideration of the moving distance of the own vehicle, an offset differential image is generated. The amount of offset d' corresponds to the moving distance on the bird's-eye view data corresponding to the actual moving distance of the own vehicle shown in FIG. 4(a) and is determined by a signal of a vehicle speed sensor 20 and a time interval between the current time and the time one unit time earlier. The first cumulative value indicates a sum of all of the values plotted as the first luminance distribution information or values in a predetermined area thereof.

Subsequently, the number of pixels are counted, which show the brightness or luminance difference more than a predetermined value between image regions adjacent to each other on the differential image of the differential image which have been obtained from the first bird's-eye view image at a first time T0 and the second bird's-eye view image at a second time T1 after the first time without aligning each other. Subsequently, the counted number of pixels is used to generate a frequency distribution so as to acquire a second cumulative value of the second luminance distribution information. In other words, a non-offset differential image is generated and the cumulative value (second cumulative value) is calculated. The second cumulative value indicates a sum of all of the values plotted as the second luminance distribution information or values in a predetermined area thereof.

Then, when the evaluation value corresponding to the number of times the second integrated value is determined larger than the first cumulative value is rated equal to or greater than a predetermined threshold, the three-dimensional object which is detected by the first three-dimensional object detection unit 33 is determined to be a "moving object". The method of calculating the evaluation value is not limited. However, in the present exemplary embodiment, each time it is determined that the second cumulative value is greater than the first cumulative value, during the process being repeatedly executed in a predetermined cycle, the evaluation point is counted up to acquire a total value as the "evaluation value".

Thus, based on the magnitude relationship between the pixel amount (edge amount) extracted from a differential image between the past captured image which is offset and the presently captured image and the pixel amount (edge amount) extracted from a differential image between the past captured image which is not offset and the presently captured image quantity, a distinction is made between the feature point of the image transition associated with a moving object and the feature point of the image transition associated with a stationary object so that it is possible to determine with high accuracy whether the three-dimensional object is a moving object or a stationary object.

In this embodiment, when a second cumulative value of pixels (edge amount) showing a predetermined difference in the differential image with respect to a non-offset image is determined larger than a first cumulative value of pixels (edge amount) showing a predetermined difference in the differential image with respect to an image obtained by offset, the evaluation value is calculated by adding the first count value. In other words, as the determinations that the second cumulative value is larger than the first cumulative value pile up, the evaluation value will be increased. Then, when the evaluation value is evaluated equal to or greater than a predetermined threshold, it is determined the three-dimensional object is a stationary object.

In this process, when the determination of the content that second cumulative value is larger than the first cumulative value is continuous, as the continuous number of this determination increases, the higher the first count value is set. Thus, when the determinations that the second cumulative value is larger than the first cumulative value continue, it is determined that the possibility that the detected three-dimensional object is a stationary object is higher. Since the first count value is set higher so as to increase the evaluation value, based on the observation on a continuous basis, the determination whether or not the three-dimensional object is a moving object may be made with high accuracy.

In addition to adding to a first count value if it is determined that the second cumulative value is greater than the first cumulative value, when if it is determined that the second cumulative value is smaller than the first cumulative value, the second count value may be subtracted to calculate the evaluation value. In this case, the stationary object detection unit 38 sets the first count value higher when the second cumulative value is determined to be greater than the first cumulative value, followed by the determination that the second cumulative value is less than the first cumulative value, further followed by the determination that the second cumulative value is greater than the first cumulative value.

Thus, when the determination that the second cumulative value is greater than the first cumulative value and the determination that the first cumulative value is greater than the second cumulative value occur alternately, it is determined that the potential is high that the detected object is a stationary object. Therefore, by increasing the first count value so as to give a greater evaluation value, in accordance with a continuous monitoring, a stationary object may be detected with high accuracy. Incidentally, a tendency exists that the state of detection of feature point of the moving object may be observed stably. Thus, when the detection result is unstable and the determination results that the three-dimensional object is a stationary object are detected in a discrete manner, the detected three-dimensional object is highly likely to be a stationary object.

Further, if it is determined that the second cumulative value is smaller than the first cumulative value, the evaluation value is calculated by subtracting the second count value. If, in this case, the determination of the content of the second cumulative value being smaller than the first cumulative value has continued a predetermined number of times or more, the second count value is set higher.

Thus, if it is determined that the second cumulative value is smaller than the first cumulative value, it is determined that the possibility that the detected three-dimensional object is a moving object (other vehicle VX) is high. Therefore, since the second count value will be increased so as to set the evaluation value for determination of the stationary object, based on the continuous observation result, a stationary object may be detected with high accuracy.

The camera 10 described above represents the image capture means according to the present invention, the viewpoint conversion unit 31 represents the image conversion means according to the present invention, the alignment unit 32 and first three-dimensional object detection unit 33 represent the first three-dimensional object detection means according to the present invention, the luminance difference calculation unit 35, edge line detection unit 36 and second three-dimensional object detection unit 37 represent the second three-dimensional object detection means according to the present invention, the three-dimensional object judgment unit 38 represents the three-dimensional object judgment means according to the present invention, the brightness or luminance detection unit 40 represents the brightness detection means according to the present invention, and the threshold value setting unit 39 represents the threshold value setting means according to the present invention.

The invention claimed is:

1. A three-dimensional object detection device, comprising:
   a camera that captures an image of a predetermined area;
   a viewport conversion unit that performs a view point conversion on the image obtained by the camera into a birds-eye view image;
   a brightness detection unit that detects a brightness in the predetermined area;
   a first three-dimensional object detection unit that detects a three-dimensional object by generating differential waveform information from a differential image of the birds-eye view images obtained by the viewport conversion unit at different times and by confirming that the differential waveform information is equal to or greater than a first threshold $\alpha$ when a brightness detected by the brightness detection unit is equal to or greater than a predetermined value; and
   a second three-dimensional object detection unit that detects a three-dimensional object by:
   detecting edge information from the birds-eye view image obtained by the viewport conversion unit; and
   confirming that the edge information is equal to or greater than a second threshold $\beta$ when the brightness detected by the brightness detection unit is less than the predetermined value that detects a three-dimensional object on the basis of the edge information;
   a three-dimensional object judgment unit that finally judges whether or not an object is a three-dimensional object from detection results; and
   a threshold value setting unit that sets both the first threshold $\alpha$ and the second threshold $\beta$ in accordance with the brightness detected by the brightness detection unit, wherein the three-dimensional object judgment unit is configured to determine the three-dimensional object when the differential waveform information is equal to or greater than the first threshold $\alpha$ and the edge information is equal to or greater than the second threshold $\beta$, and wherein
   the threshold value setting unit is configured to set a ratio of the first threshold $\alpha$ to the second threshold $\beta$, $\alpha/\beta$, smaller as the brightness detected by the brightness detection unit is darker while setting the ratio $\alpha/\beta$ smaller as the brightness is brighter.

2. The three-dimensional object detection device as claimed in claim 1, wherein the first three-dimensional object detection unit is configured to generate one-dimensional waveform information by a positional alignment of positions of the birds-eye view images on a bird's-eye view obtained by the camera at different times and subsequently counting, on the birds-eye view image aligned along a direction in which a three-dimensional object is tilted, a number of pixels that exhibit a predetermined differential to generate a frequency distribution.

3. The three-dimensional object detection device as claimed in claim 1, wherein the first three-dimensional object detection unit is configured to generate one-dimensional waveform information by counting a number of pixels that exhibit a predetermined differential to generate frequency distributions along a direction in which the three-dimensional object is tilted when converted trough the view point conversion into the birds-eye view with respect to the birds-eye view images respectively and subsequently performing a positional alignment of the differential waveform information to provide a differential of the differential waveform information.

4. The three-dimensional object detection device as claimed in claim 1, wherein the first three-dimensional object detection unit is configured to generate the differential waveform information by calculating a movement distance in real space of the birds-eye views at the different time, and aligning a position of the birds-eye view image of the different time by the calculated distance.

5. The three-dimensional object detection device as claimed in claim 1, wherein the second three-dimensional object detection unit is configured to detect the edge information along a direction in which a three-dimensional object is tilted when converted into the birds-eye view.

6. The three-dimensional object detection device as claimed in claim 1, wherein the brightness detection unit is configured to detect an amount of light from the predetermined area detected by the camera or a control value of the camera based thereon.

7. The three-dimensional object detection device as claimed in claim 1, wherein the brightness detection unit is configured to detect a characteristic value of brightness based on a position of the sun.

8. The three-dimensional object detection device as claimed in claim 1 further comprising:
   a three-dimensional object judgment unit configured to finally judge whether an object is a three-dimensional object based on the differential waveform information, the detected edge information and the detected brightness.

9. A three-dimensional object detection device, comprising:
   a camera that captures an image of a predetermined area;
   a viewport conversion unit that performs a view point conversion on the image obtained by the camera into a birds-eye view image;
   a brightness detection unit that detects a brightness in the predetermined area;
   a first three-dimensional object detection unit that detects a three-dimensional object by generating differential waveform information from a differential image of the birds-eye view images obtained by the viewport conversion unit at different times and by confirming that the differential waveform information is equal to or greater than a first threshold α when a brightness detected by the brightness detection unit is equal to or greater than a predetermined value, the first three-dimensional object detection unit further configured to:
  detect a first cumulative value representing a first differential waveform information which is generated by calculating a movement distance in real space of the birds-eye view image at the different time based on a moving speed of a moving body on which the camera is mounted, positional aligning the birds-eye view image at the different time by the calculated movement distance, and counting a number of pixels exhibiting a predetermined differential on a differential image of the birds-eye view image aligned to generate a frequency distribution; and
  obtain a second cumulative value representing a second differential waveform information by acquiring a differential image of the bird's-eye view images at different times without alignment and counting the number of pixels exhibiting a predetermined differential n the differential image, to detect the three-dimensional object dependent upon whether or not an evaluation value in accordance with the number of times in which the second cumulative value exceeds the first cumulative value is equal to or greater than a predetermined evaluation threshold; and
a second three-dimensional object detection unit that detects a three-dimensional object by;
  detecting edge information from the birds-eye view image obtained by the viewport conversion unit; and
  confirming that the edge information is equal to or greater than a second threshold β when the brightness detected by the brightness detection unit is less than the predetermined value that detects a three-dimensional object on the basis of the edge information.

* * * * *